(12) United States Patent
Jeon et al.

(10) Patent No.: US 8,278,028 B2
(45) Date of Patent: Oct. 2, 2012

(54) MATERIAL PATTERN, AND MOLD, METAL THIN-FILM PATTERN, METAL PATTERN USING THEREOF, AND METHODS OF FORMING THE SAME

(75) Inventors: Jin-Wan Jeon, Daejeon (KR); Jun-Bo Yoon, Daejeon (KR); Koeng Su Lim, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 1080 days.

(21) Appl. No.: 12/098,180

(22) Filed: Apr. 4, 2008

(65) Prior Publication Data

US 2008/0248264 A1    Oct. 9, 2008

(30) Foreign Application Priority Data

Apr. 4, 2007  (KR) .................. 10-2007-0033378

(51) Int. Cl.
*G03F 7/20* (2006.01)
(52) U.S. Cl. .................. 430/320; 430/323; 430/324
(58) Field of Classification Search .................. None
See application file for complete search history.

(56) References Cited

U.S. PATENT DOCUMENTS

| | | | |
|---|---|---|---|
| 2003/0072080 A1* | 4/2003 | Ariyoshi et al. | 359/487 |
| 2004/0027675 A1* | 2/2004 | Wu et al. | 359/619 |
| 2008/0182081 A1* | 7/2008 | Jeon et al. | 428/195.1 |

FOREIGN PATENT DOCUMENTS

| | | |
|---|---|---|
| CN | 1421711 | 6/2003 |
| JP | 1978-136968 | 11/1978 |
| JP | 2001-033629 | 2/2001 |
| JP | 2002-040623 | 2/2002 |
| JP | 2004-021052 | 1/2004 |
| JP | 2005-054119 | 3/2005 |
| JP | 2005-285262 | 4/2006 |
| KR | 1020060029125 | 4/2006 |
| KR | 1020060100340 | 9/2006 |
| KR | 643684 B1 * | 11/2006 |
| WO | WO 2005/078523 A1 * | 8/2005 |

OTHER PUBLICATIONS

Derwent abstract of KR 643684 B1 patent family (Oct. 2006).*

(Continued)

*Primary Examiner* — John A. McPherson
(74) *Attorney, Agent, or Firm* — The Belles Group, P.C.

(57) ABSTRACT

The present invention relates to a material pattern, and mold using thereof, metal thin-film pattern, metal pattern, and method of forming the sames. A method of forming the material pattern according to the present invention comprises the steps of; (a) forming a photo-sensitive material film by coating a photo-sensitive material on a substrate; (b) deciding an exposure section on the photo-sensitive material film; (c) disposing a light refraction film and a light diffusion film at a route of light exposed on the photo-sensitive material film; and (d) forming a pattern on the photo-sensitive material film, by projecting a light on the exposure section of the photo-sensitive material film, wherein the light transmits the light refraction film and the light diffusion film.

A method of forming the material pattern according to the present invention can form the material pattern of three-dimensional asymmetric structure having various inclinations and shapes and can form simply mold, metal thin-film and metal pattern using thereof.

41 Claims, 25 Drawing Sheets

OTHER PUBLICATIONS

S. Wolf and R. N. Tauber, "Silicon, Processing for the VLSI Era, vol. 1—Process Technology," Lattice Press, pp. 408, 1986.

R. C. Jaeger, "Introduction to Microelectronic Fabrication," Prentice Hall, pp. 167, 2002.

H. Sato, T. Kakinuma, J.S. Go, S. Shoji, "In-channel 3-D micromesh structures using maskless multi-angle exposures and their microfilter application" (Sen Actuators A, vol. 111, pp. 87-92, 2004).

R. Yang. J.D. Williams, and W. Wang, "A rapid micro-mixer/ reactor based on arrays of spatially impinging micro-jets" (J. Micromesh. Microeng., vol. 14, pp. 1345-1351, 2004).

M. Han, W. Lee, S.-K, Lee, and S. S. Lee, "3D microfabrication with inclined/ rotated UV lithography", Sen. Actuators A, vol. 111, pp. 14-20, 2004.

Y.-K. Yoon, J.-H. Park, and M. G Allen, "Multidirectional UV lithography for complex 3-D MEMS structures", J. Microelectromech. Syst., vol. 15, pp. 1121-1130, 2006.

G. Spruce and R. D. Pringle, "Polymer dispersed liquid crystal (PDLC) films," Electronics & Communication Engineering Journal, pp. 91-100, 1992.

\* cited by examiner metal pattern of rectangular shape (a)

(b)

(a)

(b)

(a)

(b)

(a)

(b)

(a)

(b)

(a)

(b)

MATERIAL PATTERN, AND MOLD, METAL THIN-FILM PATTERN, METAL PATTERN USING THEREOF, AND METHODS OF FORMING THE SAME

This Nonprovisional application claims priority under 35 U.S.C. §119(a) on Patent Application No. 10-2007-0033378 filed in Republic of Korea on Apr. 4, 2007, the entire contents of which are hereby incorporated by reference.

BACKGROUND OF THE INVENTION

1. Field of the Invention

The present invention relates to material pattern, and mold using thereof, metal thin-film pattern, metal pattern, and method of forming the sames, and more specially to polymer or resist pattern, and mold using thereof, metal thin-film pattern, metal pattern, and method of forming the sames.

2. Description of the Background Art

In general, for configuring a metal wiring in a circuit device such as semiconductor, first a polymer pattern having a predetermined shape should be formed. Such a polymer pattern is formed through a photolithography process including a photoresist coating process, an exposure process, and a development process.

FIG. 1 represents sequentially a method of forming a photosensitive polymer pattern using a conventional lithography process.

As shown in FIG. 1, a photoresist made of polymer is coated on a substrate 100 to form a photoresist film. A photomask 120 is arranged in the upper part of the photoresist film 110. A light 130 is selectively projected on the substrate 100 where the photoresist film 110 is formed to perform the exposure process. After performing the exposure process, by performing the development process on the exposed photoresist film 110, a part of the photoresist film 110 reacted to the light is eliminated to form the polymer pattern.

The photosensitive polymer or resist film is exposed by Ultraviolet-UV passing a photomask having a pattern of geometric figure and a projection of the rest light in a general lithography process of a semiconductor. The exposed section is formed by a required pattern through a development process of the exposed section. In case of using a positive photosensitive resist, a section exposed by light is melted by a development solution and forms a pattern. In case of using a negative photosensitive resist, a section unexposed by light is melted by a development solution and forms a pattern.

FIG. 2 represents a cross-section of a photosensitive polymer, a resist pattern and a metal pattern manufactured by a lithography process of the related art.

As shown in FIG. 2, a cross section of a polymer or a resist pattern projects the light perpendicular to the substrate during the exposure process where the light is projected on the substrate, thus a pattern of a polymer or a resist is formed from a perpendicular structure of rectangular shape. S. Wolf and R. N. Tauber, "Silicon Processing for the VLSI Era, Volume 1—Process Technology", Lattice Press, pp. 408, 1986.

Accordingly, a metal wiring in a VLSI device using a polymer pattern having a rectangular cross-section also forms on the polymer pattern, thus a metal pattern having a rectangular cross-section shape is formed. R. C. Jaeger, "Introduction to Microelectronic Fabrication", Prentice Hall, pp. 167, 2002.

However, the conventional polymer pattern or metal pattern having the rectangular shape or the metal pattern can not satisfy the need on various patterns having three-dimensional structure devices. The various techniques for the semiconductor are developed and the applied field thereof is varied, thus it needs for three-dimensional structure of polymer pattern or metal pattern, etc. having an inclined shape in difference with the conventional technique.

Various techniques of lithography are developed for manufacturing three-dimensional structure and shape. As for the technique of inclined lithography being usable for forming an inclined structure in the perpendicular direction, it is applied variously to manufacture the microscopic material system. Contrary to a general photolithography exposure using a parallel light incident in a perpendicular direction in a photomask and substrate, as illustrated in FIG. 3(a), it has a constant angle θ in a photomask 160 and substrate 150, and it uses the parallel light 170 incident in the inclined direction to expose. Consequently, it can form a pattern of shape inclined with a constant angle. In case of left side 180, it is a positive photo-sensitive photoresist that the exposed section is removed, and the unexposed section is left. In case of right side 181, it is a negative photo-sensitive photoresist that the exposed section is left, and the unexposed section is removed. A papers "H. Sato, T. Kakinuma, J. S. Go, S. Shoji "In-channel 3-D micromesh structures using maskless multi-angle exposures and their microfilter application" (Sen. Actuators A, vol. 111, pp. 87-92, 2004)" and R. Yang, J. D. Williams, and W. Wang, "A rapid micro-mixer/reactor based on arrays of spatially impinging micro-jets" (J. Micromech. Microeng., vol. 14, pp. 1345-1351, 2004) record examples to make a movement route of the microscope materiality and manufacturing a filter, etc. by using the technique of inclined lithography.

Also, in order to manufacture an inclined structure of more complex three-dimensional shape by applying the technique of inclined lithography, the technique exposing with rotating a light source with a fixed plate and the technique exposing with rotating a photomask and a stage where the substrate are putted a light source with a fixed plate are developed. These techniques expose a few times by rotating freely the light source and substrate and manufacture a pattern of various shapes of three-dimensional curved surface.

The inclined/rotating technique rotating a substrate with a fixed light source (reference: Y.-K. Yoon, J.-H. Park, and M. G. Allen, "Multidirectional UV lithography for complex 3-D MEMS structures", J. Microelectromech. Syst., vol. 15, pp. 1121-1130, 2006) and the technique for lithography having various directions (reference: Y.-K. Yoon, J.-H. Park, and M. G. Allen, "Multidirectional UV lithography for complex 3-D MEMS structures", J. Microelectromech. Syst., vol. 15, pp. 1121-1130, 2006) are used representatively. FIG. 3(b) is a device for special lithography so as to expose with rotating in reference to the paper of Y.-K. Yoon. It rotates a substrate by a rotated stage 190 and exposures to inclined shape, thus it manufactures three-dimensional pattern.

Consequently, these methods have a problem that is required for special device for lithography preparing a device rotating a light source to expose or a device rotating the stage where an exposed substrate or a substrate is putted. Accordingly, in order to make an inclined shape of three-dimension, it is required for a lithography device which can rotate an ultraviolet rays or substrate. Also, in order to make an inclined structure having a complex shape, it is difficult to change a sequential inclination angle by using a device which can control for rotating an ultraviolet rays or substrate to rotate.

Additionally, a method of lithography for forming a pattern of three-dimensional shape on a polymer or a resist is developed as follows. As illustrated in FIG. 4, according to the patent right No. 10-0649937 of the republic of korea (i.e., a method of forming polymer pattern and metal thin film using thereof, metal pattern, plastic mold structure and method of forming the sames), it forms polymer film 201 on the substrate 200 and forms a polymer pattern 206, 207 of circular cross-section by passing an arbitrary progressing light through photomask 202. It uses a method that it puts a diffuser sheet 208 in a route of exposing and progresses the light exposed on polymer by dispersing light in an arbitrary direction. It can manufacture a polymer pattern having three-dimensional shape and various metal patterns, etc.

As illustrated in FIG. 5, according to the patent registration No. 10-0649937 filed in korea (i.e., a method of forming polymer pattern and metal thin film using thereof, metal pattern, plastic mold and method of forming the sames), it can manufacture a pattern of various three-dimensional shapes from a circular shape to a rectangular shape. It forms a polymer or a resist film 310 on the substrate 300 and disposes a photomask 320, and thus it forms a section which will be exposed and unexposed 350, 351, and it puts a controlling film of light 340 at a route of exposing. Also, it can control variously a shape exposed on a polymer or a resist from a circular shape 353, 354 to a rectangular shape 355 by a method of controlling a progressing character of light or strength.

It can form simply the structure of three-dimensional shape by above two inventions. However, it controls symmetrically the progress direction of light on the space in case of a polymer dispersed liquid crystal film representing the control film of light for controlling a progress direction of light and the diffuser dispersing the light for exposing. Accordingly, the manufactured three-dimensional shape has only a structure of symmetric space. Consequently, there is a problem that it can not form a polymer or a resist pattern of three-dimensional symmetric structure having an inclined shape with a specific angle for various applications.

SUMMARY OF THE INVENTION

Accordingly, an object of the present invention is to solve at least the problems and disadvantages of the background art.

It is an object of the present invention to provide a polymer or a resist pattern of three-dimensional asymmetric structure having various inclinations and shapes, by controlling a diffusion degree and strength together with a progress direction of incident light in a lithography process using conventional lithography device, and a method manufacturing the same.

It is another object of the present invention to provide a polymer or a resist pattern of three-dimensional asymmetric structure having various inclinations and shapes according to the situation, by controlling partially the progress direction of light incident for exposing and the diffusion degree and the transmission degree in a lithography process, and a method manufacturing the same.

It is another object of the present invention to provide mold using a polymer or a resist pattern having three-dimensional asymmetric structure and a method manufacturing the same.

It is another object of the present invention to provide metal thin-film pattern using a polymer or a resist pattern having three-dimensional asymmetric structure and a method manufacturing the same.

It is another object of the present invention to provide metal pattern using a polymer or a resist pattern having three-dimensional asymmetric structure and a method manufacturing the same.

According to an aspect of the present invention, provided is a method of forming a pattern. The method comprises the steps of (a) forming a photo-sensitive material film by coating a photo-sensitive material on a substrate; (b) deciding an exposure section on the photo-sensitive material film; (c) disposing a light refraction film and a light diffusion film at a route of light exposed on the photo-sensitive material film; and (d) forming a pattern on the photo-sensitive material film, by projecting a light on the exposure section of the photo-sensitive material film, wherein the light transmits the light refraction film and the light diffusion film.

The step of (b) may decide the exposure section, by forming one of a photomask, an embedded mask and a metal pattern on the photo-sensitive material film.

The step of (b) may decide the exposure section, by disposing a micro mirror array at the route of light exposed on the photo-sensitive material film.

The substrate may be a transparent substrate.

The step of (b) may decide the exposure section, by forming one of a photomask, an embedded mask and a metal pattern on the upper or lower part of the transparent substrate.

The light refraction film may be a prism or prism sheet where a single-inclined plane, a multi-inclined plane, a multi-curved surface, a cone and many-sided cone are formed repeatedly.

The light diffusion film may be a diffuser or a polymer dispersed liquid crystal film.

The method may further comprise the step of sequentially changing a diffusion degree of the light diffusion film to control.

The method may further comprise the step of partially controlling a diffusion degree of the light diffusion film.

The method may further comprise the step of sequentially changing a supply voltage supplied to the polymer dispersed liquid crystal film or a supply time of light incident in the polymer dispersed liquid crystal film to control.

The method may further comprise the step of partially controlling a supply voltage supplied to the polymer dispersed liquid crystal film or a supply time of light incident in the polymer dispersed liquid crystal film.

The method may further comprise the step of forming an electrode patterned on both of the cross-sections or one cross-section of the polymer dispersed liquid crystal film.

The method may further comprises the step of driving a passive matrix, by patterning more than one of electrodes situated on both of the cross-sections of the polymer dispersed liquid crystal film.

The method may further comprises the step of driving an active matrix through a switching element, by patterning more than one of electrodes situated on both of the cross-sections of the polymer dispersed liquid crystal film.

The method further comprises the step of (e) forming the plurality of transparent electro-conductive films on the surface of the light diffusion film between the light diffusion film and the photo-sensitive material film.

The method may supply different voltages for a plurality of transparent electro-conductive films.

The step of (d) forms the material pattern, by exposing to the bottom of the photosensitive material film.

The step of (a) comprises the step of forming a transfer film on the substrate; and the step of forming the photo-sensitive material film on the transfer film.

The step of (a) further comprises the step of etching the material pattern and transferring the material pattern to the transfer film.

The photo-sensitive material may be a polymer or a resist.

According to another aspect of the present invention, a pattern being formed by the method of forming the material pattern may have an asymmetric pattern in the perpendicular or horizontal direction to a substrate.

The photo-sensitive material may be a polymer or a resist.

According to another aspect of the present invention, a method of forming a mold comprises the steps of (a) forming a photo-sensitive material film by coating a photo-sensitive material on a substrate; (b) deciding an exposure section on the photo-sensitive material film; (c) disposing a light refraction film and a light diffusion film at a route of light exposed on the photo-sensitive material film; and (d) forming a pattern on the photo-sensitive material film, by projecting a light on the exposure section of the photo-sensitive material film, wherein the light transmits the light refraction film and the light diffusion film; (e) coating and solidifying a material forming a mold on the material pattern; and (f) separating the solidified material forming the mold from the material pattern.

The material forming of the mold may be a plastic or a polymer.

The step of (b) may decide the exposure section by forming one of a photo mask, an embedded mask or a metal pattern on the material film.

The step of (b) may decide the exposure section by depositing micro mirror array at the route of a light exposed on the photo-sensitive material film.

The light refraction film may be a prism or prism sheet where a single-inclined plane, a multi-inclined plane, a multi-curved surface, a cone and many-sided cone are formed repeatedly.

The light diffusion film may be a diffuser or a polymer dispersed liquid crystal film.

The photo-sensitive material may be a polymer or a resist.

According to another aspect of the present invention, a mold structure being formed by the method of forming the mold may have an asymmetric pattern in the perpendicular or horizontal direction to a substrate.

According to another aspect of the present invention, A method of forming a metal thin-film comprises the steps of (a) forming a photo-sensitive material film by coating a photo-sensitive material on a substrate; (b) deciding an exposure section on the photo-sensitive material film; (c) disposing a light refraction film and a light diffusion film on a route of light exposed on the photo-sensitive material film; and (d) forming a pattern on the photo-sensitive material film, by projecting a light on the exposure section of the photo-sensitive material film, wherein the light transmits the light refraction film and the light diffusion film; (e) forming a metal thin-film on the material pattern; and (f) removing the material pattern.

The step of (b) may decide the exposure section by forming one of a photo mask, an embedded mask or a metal pattern on the photo-sensitive material film.

The step of (b) may decide the exposure section by depositing micro mirror array at the route of a light exposed on the photo-sensitive material film.

The step (e) may form the metal thin-film by a method of evaporating or sputtering a thin-film, or a method of forming a rear film including a method of plating.

The refraction film may be a prism or prism sheet where a single-inclined plane, a multi-inclined plane, a multi-curved surface, a cone and many-sided cone are formed repeatedly.

The light diffusion film may be a diffuser or a polymer dispersed liquid crystal film.

The photo-sensitive material may be a polymer or a resist.

According to another aspect of the present invention, a metal thin-film pattern being formed by the method of forming the method of forming metal thin-film may have an asymmetric pattern in the perpendicular or horizontal direction to a substrate.

According to another aspect of the present invention, a method of forming a metal pattern comprises the steps of (a) forming a photo-sensitive material film by coating a photo-sensitive material on a substrate; (b) deciding an exposure section on the photo-sensitive material film; (c) disposing a light refraction film and a light diffusion film at a route of light exposed on the photo-sensitive material film; and (d) forming a pattern on the photo-sensitive material film, by projecting a light on the exposure section of the photo-sensitive material film, wherein the light transmits the light refraction film and the light diffusion film; (e) forming a metal thin-film on the polymer or resist pattern; (f) forming a metal pattern on the metal thin-film by plating method; and (g) separating the metal pattern formed from the material pattern.

The step of (b) may decide the exposure section by forming one of a photo mask, an embedded mask or a metal pattern on the photo-sensitive material film.

The step of (b) may decide the exposure section by depositing micro mirror array at the route of a light exposed to the photo-sensitive material film.

The light refraction film may be a prism or prism sheet where a single-inclined plane, a multi-inclined plane, a multi-curved surface, a cone and many-sided cone are formed repeatedly.

The light diffusion film may be a diffuser or a polymer dispersed liquid crystal film.

According to another aspect of the present invention, a metal pattern being formed by the method of forming the method of forming metal pattern may have an asymmetric pattern in the perpendicular or horizontal direction to a substrate.

The photo-sensitive material may be a polymer or a resist.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Hereinafter, preferred embodiments of the present invention will be described in detail with reference to the accompanying drawings.

The advantages and objects of the present invention and a method achieving the objects will be clearly understood by referring to the following embodiments which are described with reference to the accompanying drawings. However, it will be apparent to those skilled in the art that various changes and modifications may be made without departing from the scope of the invention as defined in the following claims. The present invention is only defined by the scope of claims in the present specification. Herein, the same reference number is given to the same constituent element throughout the specification although it appears in different drawings.

First of all, a same component of the accompanying drawings will be described by a sign of same drawing for a convenience of explanation.

Figure 1:
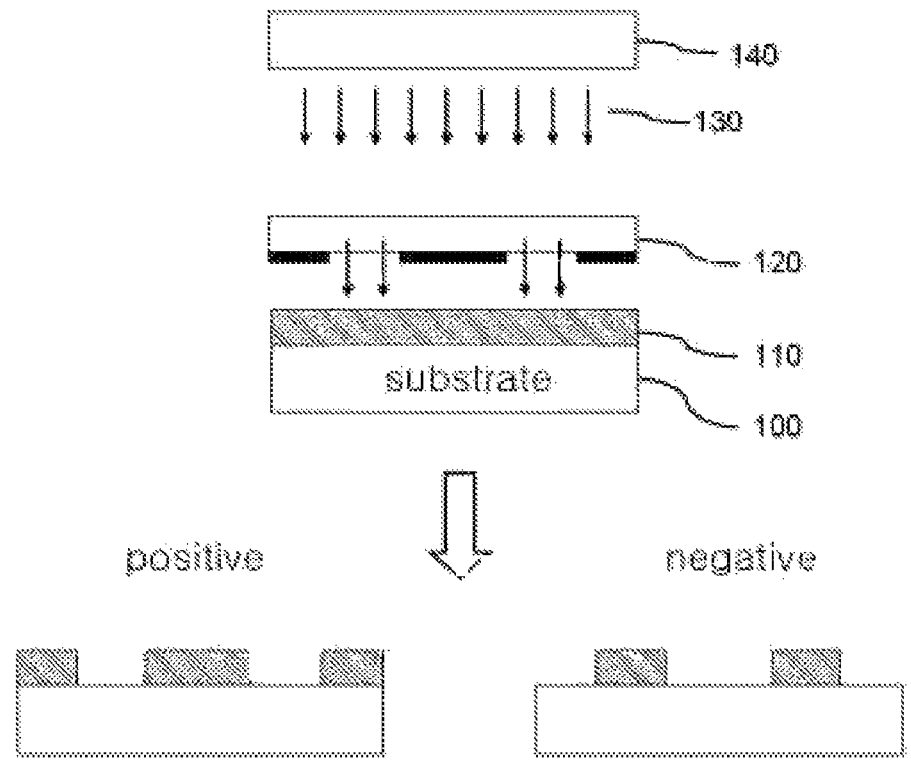
FIG. 1 represents sequentially a process of forming a positive photosensitive polymer pattern using a lithography process of the related art.
Figure 2:
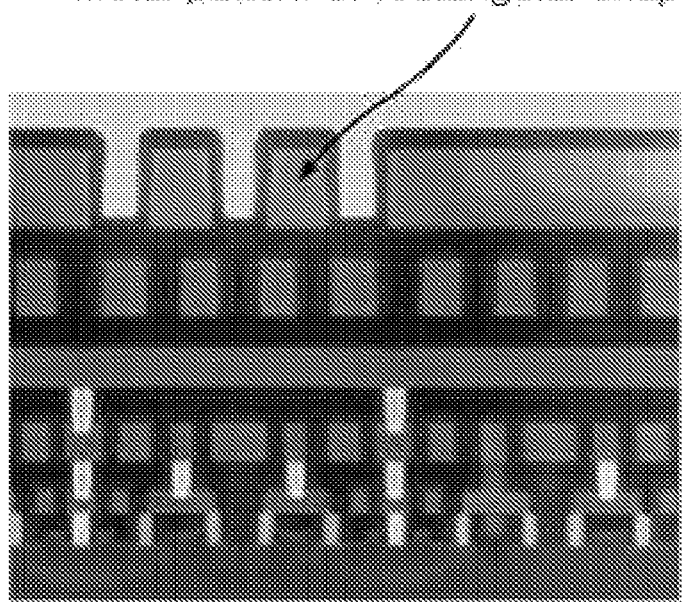
FIG. 2 represents a cross-section of a metal pattern manufactured by a polymer pattern of the related art.
Figure 3:
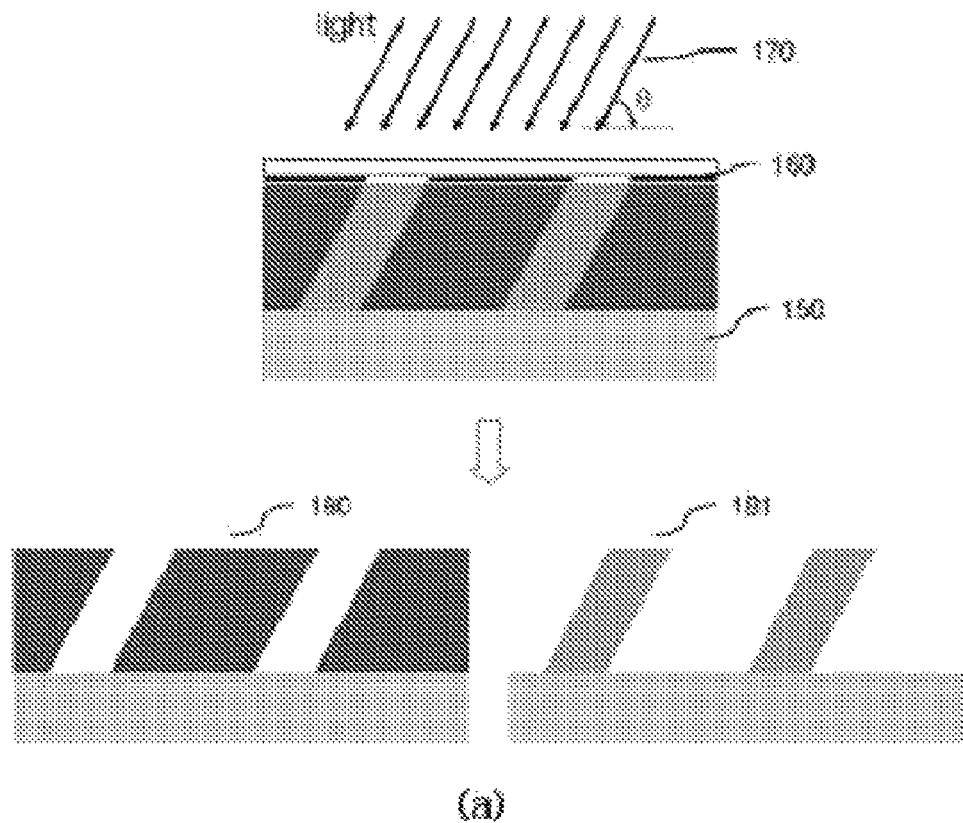
FIG. 3 represents a method of inclining a shape of a resist pattern of the related art.
Figure 3:
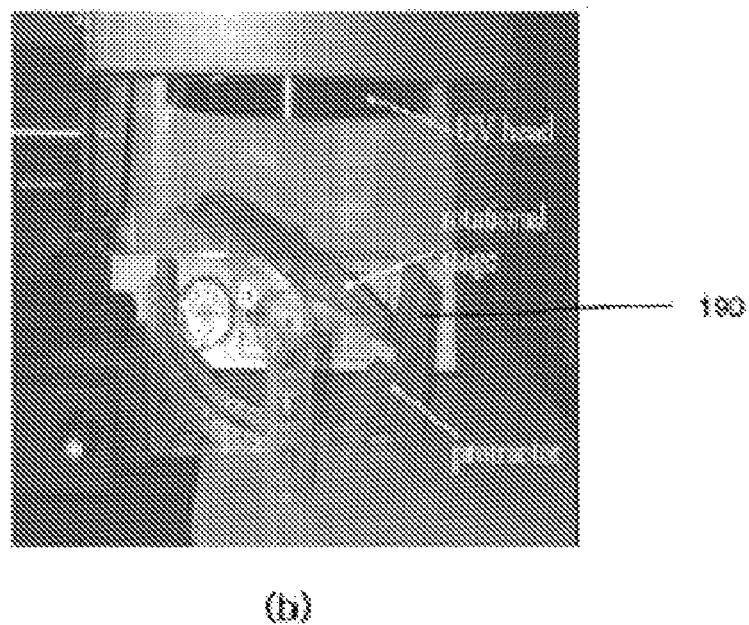
Figure 4:
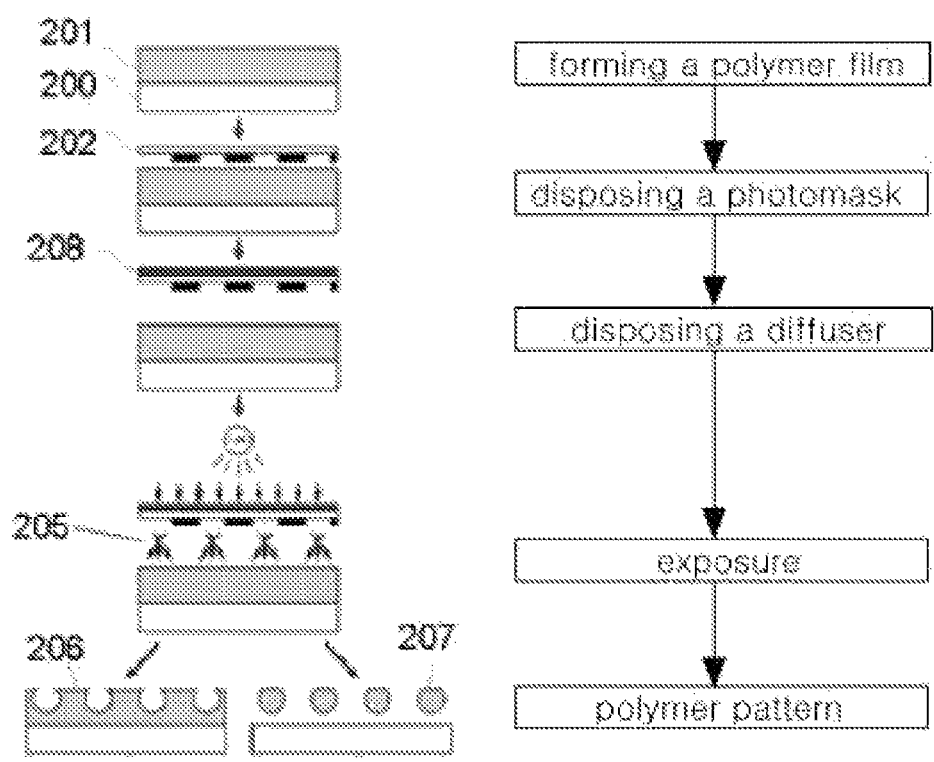
FIG. 4 represents a method of forming a circular shape of a polymer or a resist pattern of the related art.
Figure 5:
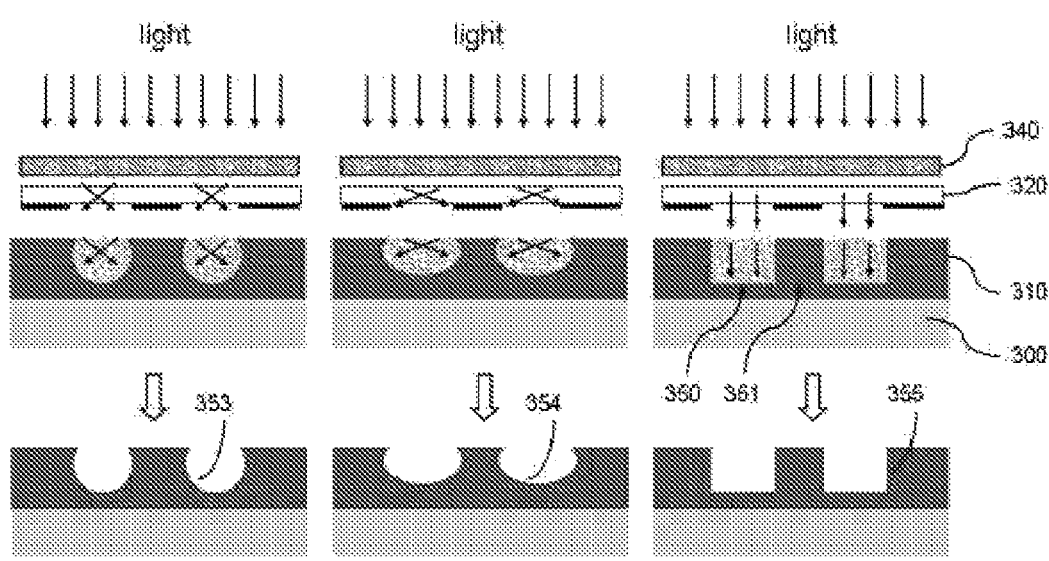
FIG. 5 is a method of inclining various three-dimensional shapes of a polymer or a resist pattern of the related art.
Figure 6:
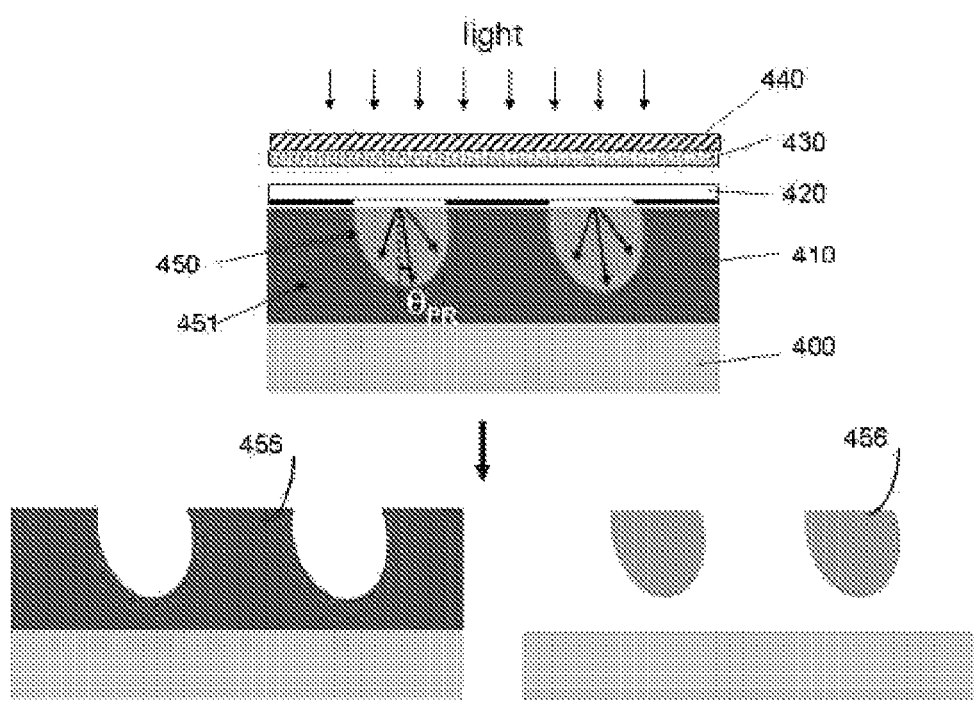
FIG. 6 represents a method of forming a polymer or a resist pattern according to an embodiment of the present invention.

FIG. 6 is a view for explaining a method of forming a polymer or a resist pattern according to an embodiment of the present invention.

First of all, after forming a photo-sensitive polymer or resist film 410 by coating a photo-sensitive polymer or resist on a substrate 400, a photomask 420 is formed on the photo-sensitive polymer or resist film 410. An embedded mask is formed on the surface of photo-sensitive polymer or resist film 410. Subsequently, a light refraction film 440 refracting a progress direction of light incidence and a light diffusion film 430 diffusing the light is disposed on a route for an exposure process. The light transmitting the light refraction film 440 and the light diffusion film 430 is collimated on the polymer or resist film 410, and a polymer or a resist thin-film of three-dimensional asymmetric structure having various shapes and angle $\theta_{PR}$ from a inclined circular cross-section to a pattern of rectangular cross-section is formed. In this case, the above effect can be expected wherever the light refraction film 440 and light diffusion film 430 is placed on the routine of light.

The photomask 420 can be used as a shape which a chrome thin-film is coated on an upper layer of transparent square substrate. Also, it can be used by patterning and forming an embedded mask after evaporating directly a metal on the surface of the polymer or resist film 410. The polymer or resist film 410 being placed under the photomask 420 is divided into an exposed section 450 and an unexposed section 451 by light transmitting the photomask 420. After this exposure process, if it is putted in a development solution, then an unexposed section 451 is left by light in case of a positive photo-sensitive polymer or resist. Reversely, an exposed section 450 is left by light in case of a negative photo-sensitive polymer or resist. A left polymer or resist pattern 455 being formed in this way is positive photo-sensitive, and a right polymer or resist pattern 455 is negative photo-sensitive.

The method of forming a polymer or a resist pattern according to an embodiment of the present invention disposes the light refraction film 440 and the light diffusion film 430 at a route of light in order to expose on the photo-resist polymer or resist in a general lithography process and can control sequentially or partially a progress direction of light and diffusion degree of light. Herein, a method of controlling sequentially or partially the diffusion degree of the light diffusion film will be described particularly in the embodiment of the diffuser or the polymer dispersed liquid crystal film as the light diffusion film 430 following later.

After all, if the method of forming the polymer or the resist pattern according to an embodiment of the present invention is used, then the polymer or resist pattern 455, 456 of three-dimensional asymmetric structure having freely various inclinations and shapes in the perpendicular and horizontal direction to the substrate 400 in the photo-sensitive polymer or resist film 410 can be formed.

Figure 7:
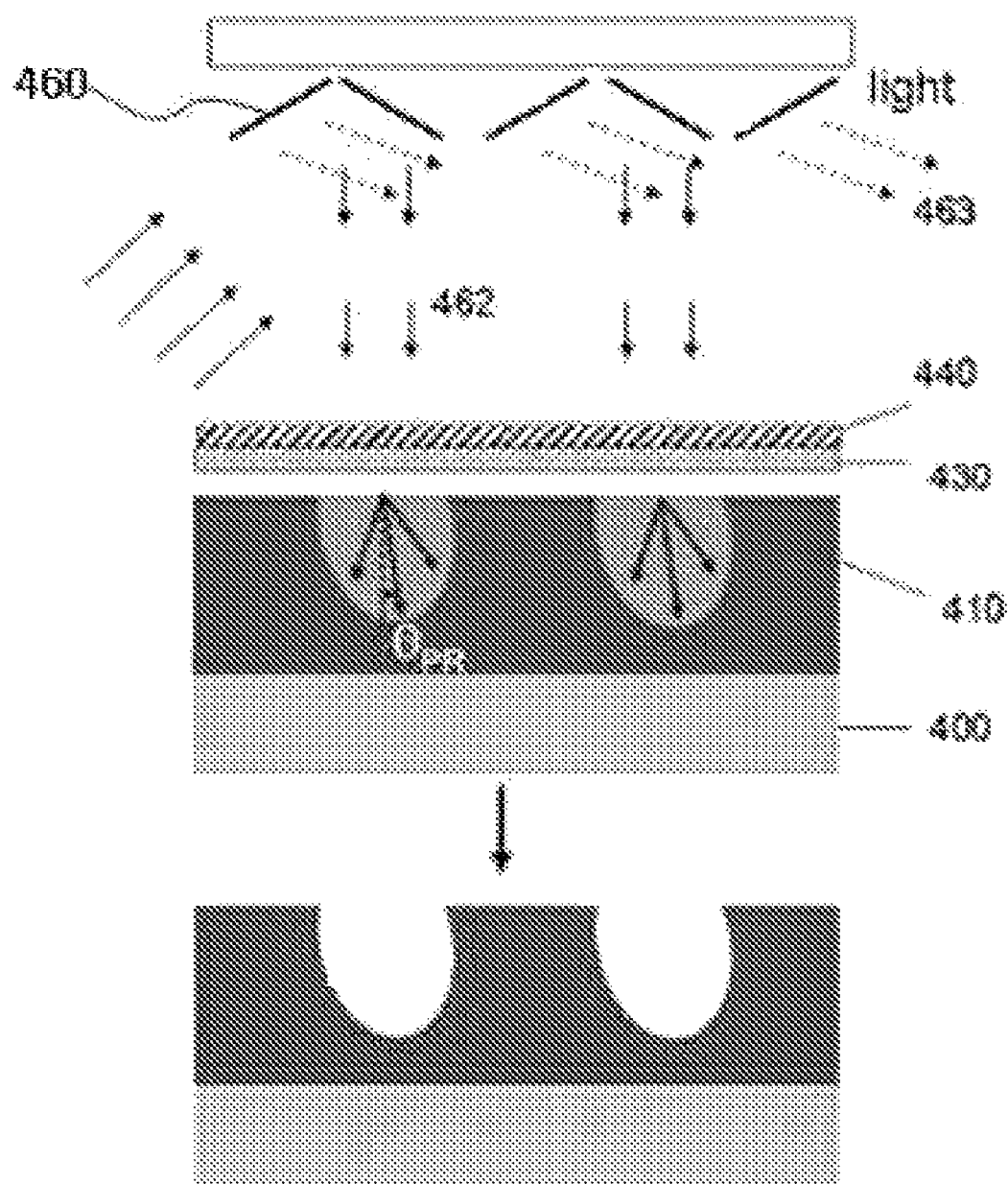
FIG. 7 represents a method of forming a polymer or a resist pattern according to another embodiment of the present invention.

FIG. 7 represents a method of forming a polymer or a resist pattern according to another embodiment of the present invention.

A maskless lithography controls a light incident 462 and a light non-incident 463 on the polymer or the resist film according to an operation angle of micro mirror array 460. A part which will be exposed or unexposed can be selected by controlling optionally the micro mirror array 460, and then it can lithograph without a photomask in a method of forming the polymer or the resist pattern according to an embodiment of the present invention described above. By using the micro mirror array 460 instead of a general photomask or embedded mask, the light refraction film 440 and light diffusion film 430 are disposed on a exposure routine of light in the maskless lithography process selecting the part of exposed or unexposed and, then, control a refraction degree and diffusion degree of light. Thus it can form the polymer or the resist pattern of three-dimensional asymmetric structure having freely various inclinations and shapes in the perpendicular or horizontal direction of the substrate 400 in the polymer or resist film 410.

Figure 8:
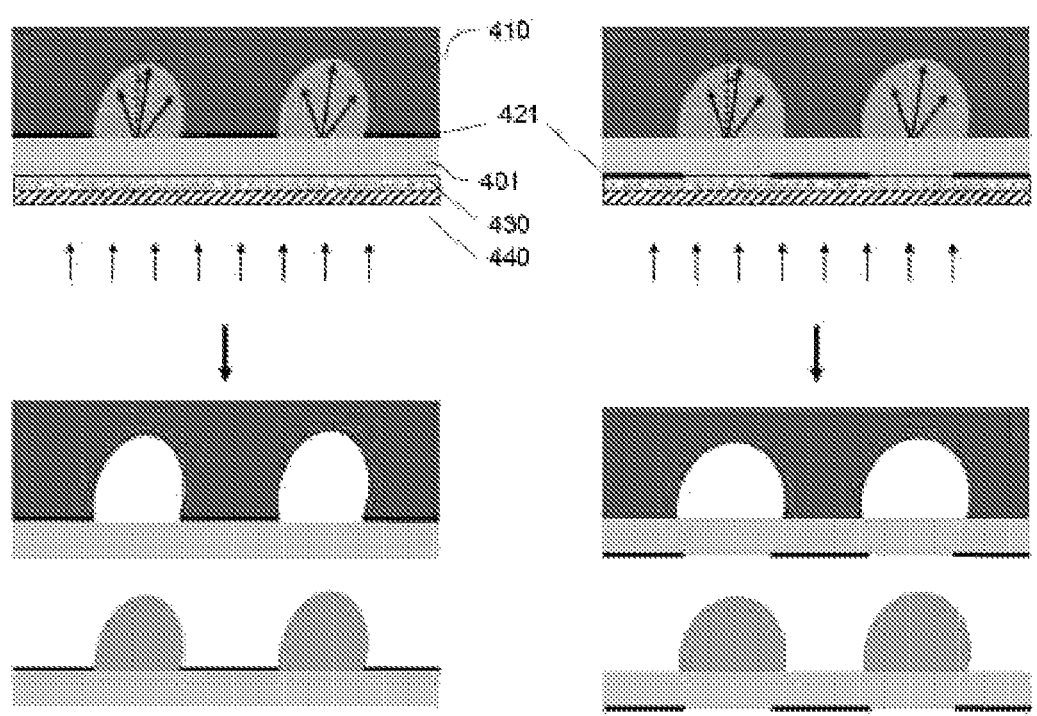
FIG. 8 represents a method of forming a polymer or a resist pattern according to another embodiment of the present invention.

FIG. 8 represents a method of forming a polymer or a resist pattern according to another embodiment of the present invention.

First of all, a metal pattern mask 421 is formed on the upper or lower surface. Thereafter, a photo-sensitive polymer or resist film 410 is formed by coating a photo-sensitive polymer or resist. In this case, the polymer or resist film 410 can be formed in the part which a metal pattern 421 is formed or in the other side of the part which is not formed. Subsequently, a light refraction film 440 refracting a progress direction of incident light (that is light incident from lower direction of the transparent substrate 401 in the drawing) and a light diffusion film 430 diffusing light are disposed at a route of light for an exposure process. The light transmitting the light refraction film 440 and diffusion film 430 of light are collimated on the polymer or resist film 410 through a transparent substrate 401, and then various polymer or resist patterns of three-dimensional asymmetric structure from a circular cross-section inclined with a predetermined angle to a pattern of rectangular cross-section is formed. In this case, the light refraction film 440 and diffusion film 430 of light can expect the above effect wherever it is putted at a route of light. According to positive or negative character of polymer or resist, the part which the light is collimated can be left like the drawing, or the part where the light is not collimated can be left.

Also, instead of deciding the part of being exposed on the transparent substrate 401 with the metal pattern 421 and the part of being unexposed, it can decide the part which will be exposed using the photomask or the micro mirror array.

Figure 9:
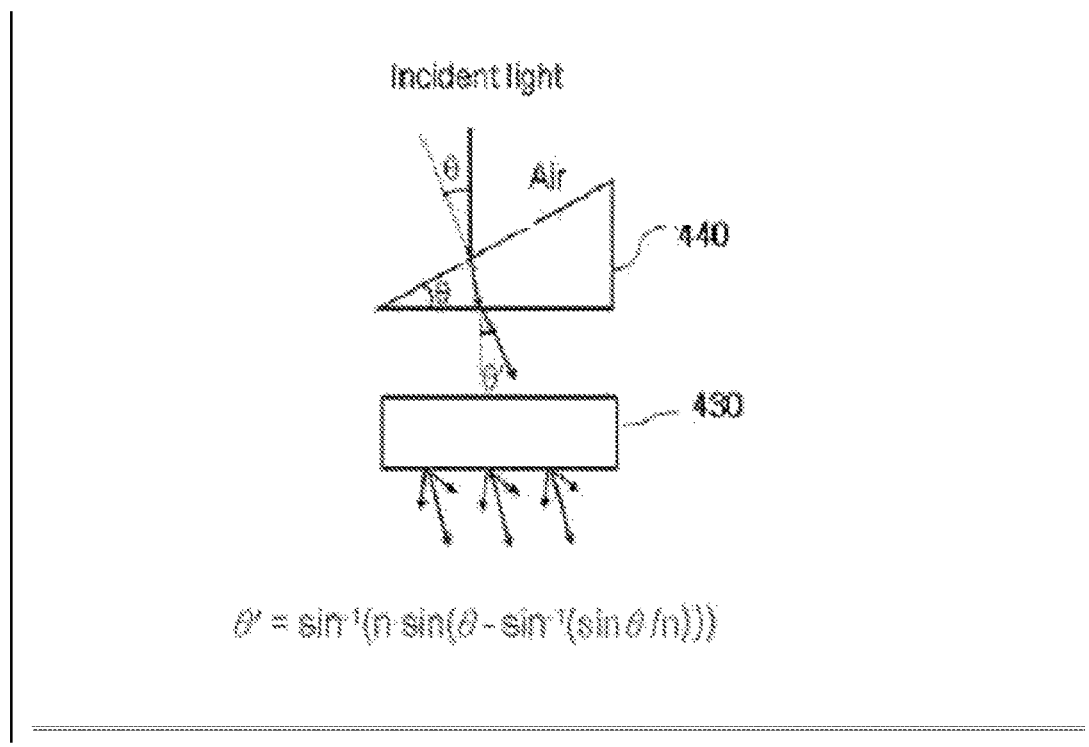
FIG. 9 represents a light refraction film according to the present invention.

FIG. 9 is a drawing for explaining a light refraction film 440 described in FIG. 6.

The light refraction film 440 is an object for refracting an incident light and changing a progress direction of light. As illustrated in FIG. 9, the light refraction film 440 is generally formed as a structure which a perpendicular cross-section has a constant inclination angle θ. The light incident with an inclined structure, as a formula (assuming that medium which original light progresses is 'n=1') being represented in FIG. 6 by a snell's law, decides the refraction angle of light θ' projected according to the inclination angle and refraction rate n of the light refraction film 440. As for a representative object having a perpendicular cross-section of constant inclination angle θ, a prism or prism sheet can be used. The refracted light with constant angle θ' by the light refraction film 430 projects in the light diffusion film 430 and is diffused in the plural directions inclined constantly. By using this light, it transfers the photomask and exposes in the polymer or resist film. It is explained by establishing 2 dimension plane as a standard, but it is axiomatic that also operates in the three-dimensional space as the same principal.

Figure 10:
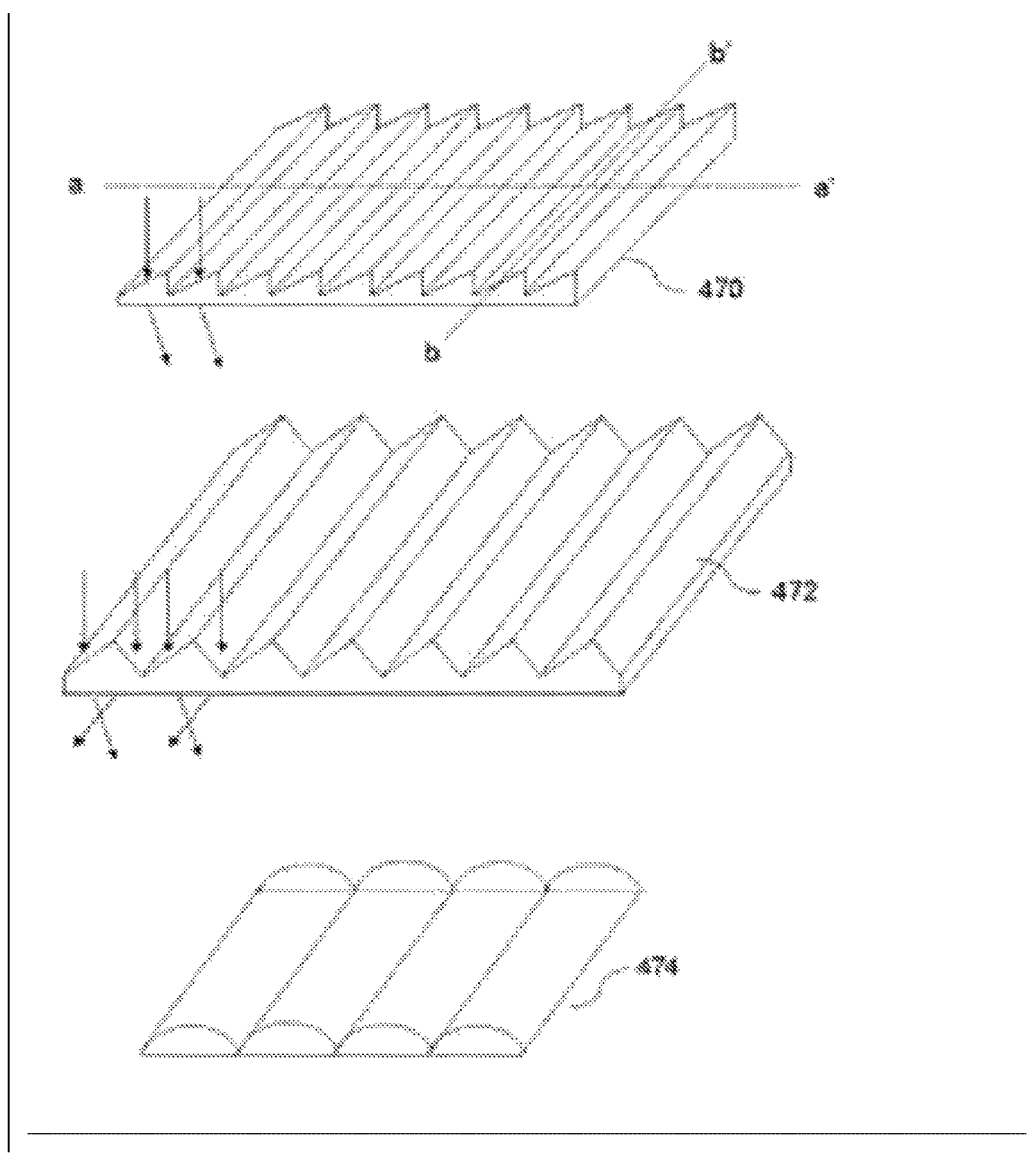
FIG. 10 represents various types of light refraction film according to an embodiment of the present invention.
Figure 11:
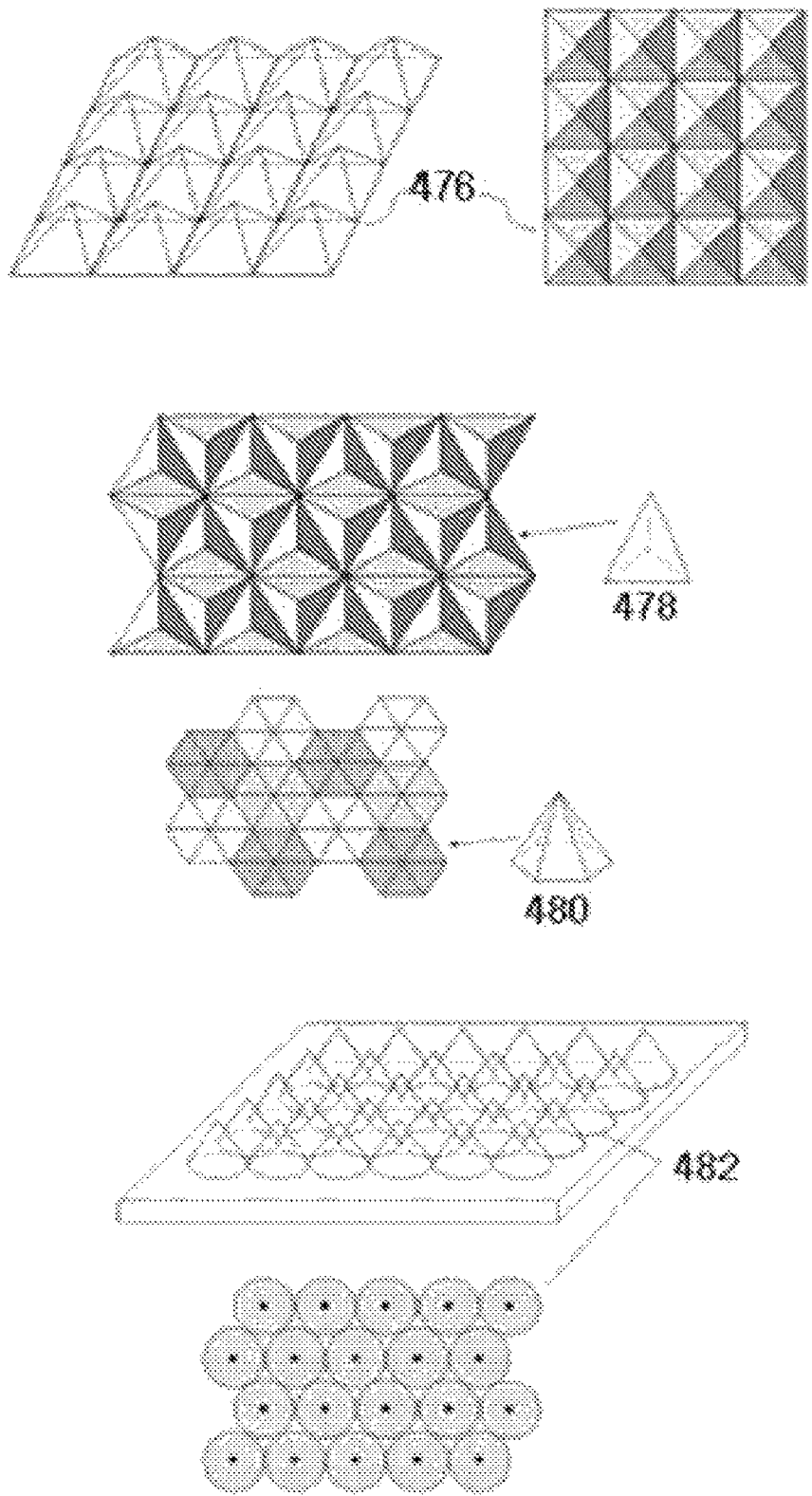
FIG. 11 represents various types of light refraction film according to another embodiment of the present invention.

FIGS. 10 and 11 represent various types of light refraction film.

As illustrated in FIG. 10, a light refraction film 470 described first has a shape which a perpendicular cross-section direction a-a' of prism or prism sheet forms repeatedly a inclined plane having a shape of right triangle. In this case, all lights incident on the light refraction film 470 are refracted in the same direction and are projected. As an inclination pattern is repeated constantly in a-a' cross-section, a refraction of light occurs constantly in this direction. In other word, b-b' cross-section is configured not to form an inclination pattern, thus the refraction development does not occur in this direction. A light refraction film 472 described second has a shape which a perpendicular cross-section direction of prism or prism sheet forms repeatedly a double inclined plane having a shape of triangle. In this case, the light incident on the light refraction film 472 is refracted in two directions and is projected. A light refraction film 474 described third has a shape which a perpendicular cross-section direction of prism or prism sheet forms repeatedly a double inclined plane having a shape of curved or circular surface. In this case, according to a situation of the light refraction film 472, the light progresses with various refraction angles.

Also, a shape of inclination plane in a prism or prism sheet being different with the repeated linear shape illustrated in FIG. 11 may be the inclined plane which shapes of many-sided pyramid or conical pyramid 482 of quandrangular pyramid 476, trigonal pyramid 478 or hexagonal pyramid 480, etc. are formed repeatedly, as illustrated in FIG. 11. In this case, an incident angle is decided by a spatial shape of inclined plane in the incident light, and a refraction angle is decided by a refraction rate of material being composed of prism. Beyond that, it is axiomatic that a curved shape of spherical shape, hemi-spherical shape etc. and an arbitrary free concavo-convex or inclined plane also can be used.

Also, by differentiating the shape and inclination according to spatial situation of prism or prism sheet 470, 472, 474, 476, 478, 480, 482 described above, it can control the refraction angle of light variously with a spatial situation.

Figure 12:
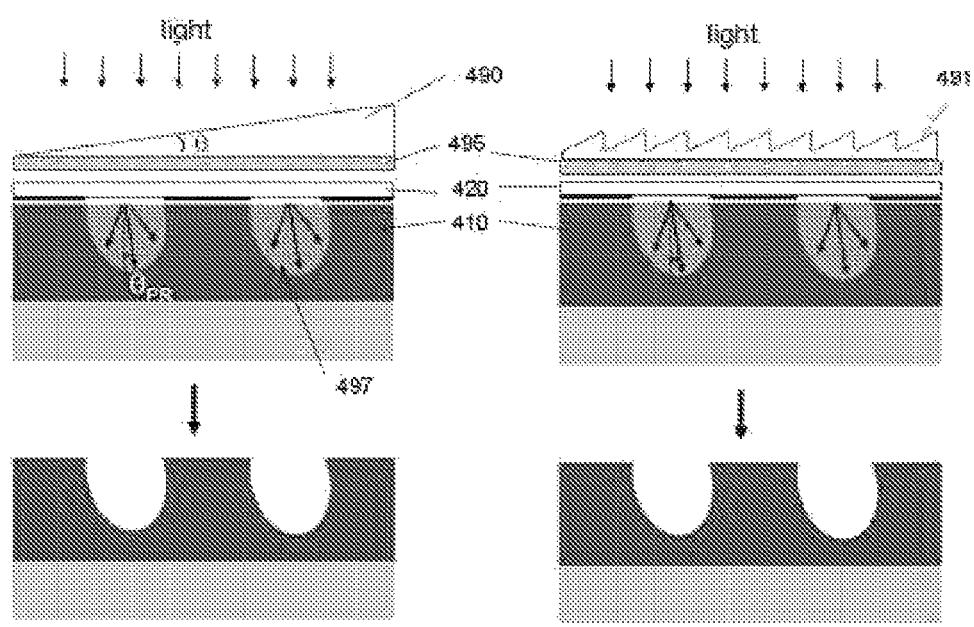
FIG. 12 represents a diffuser used as an embodiment of a light diffusion film according to the present invention.

FIG. 12 represents a diffuser used as an embodiment of a light diffusion film 430 described in FIG. 6. A diffuser 495 is an object dispersing and progressing an incident light. In general, opal etc. is coated on the surface, or it makes the surface roughly and disperses the light. As illustrated in FIG. 12, a progress direction of light is refracted while it uses prism 490 or prism sheet 491 as a light refraction film, and the light is dispersed while a refracted light passes the diffuser 495. Accordingly, as the progress direction of incident light is refracted by a light refraction film 490, 491 as the whole and is inclined, the shape 497 exposed on the polymer or resist film 410 by passing the photomask 420 has three-dimensional asymmetric structure inclined with constant angle $\theta_{PR}$. If it develops after this process, then it can form a polymer or a resist pattern of three-dimensional asymmetric structure. As for positive photo-sensitive polymer or resist in FIG. 12, an exposed section is left in case of using negative photo-sensitive polymer or resist and an unexposed section is removed.

Figure 13:
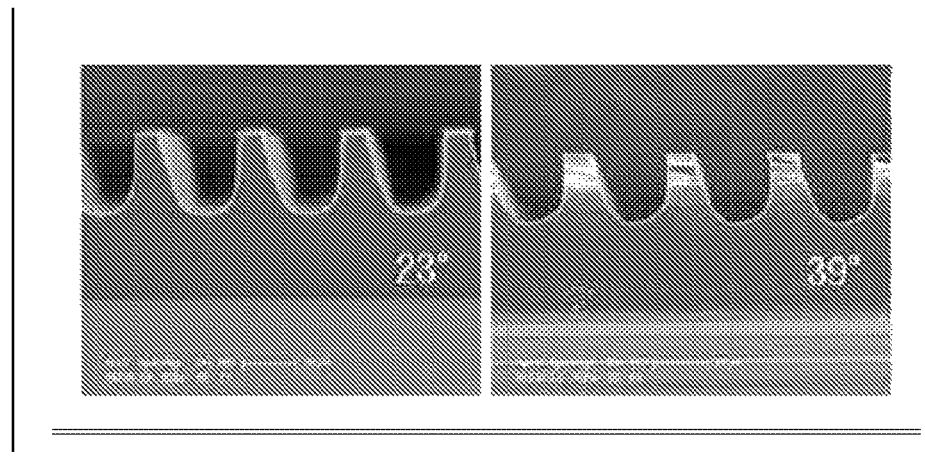
FIG. 13 represents an electron microscope photo of a polymer or a resist pattern in three-dimensional asymmetric structure manufactured on a positive photosensitive photoresist using a diffuser of surface having an uneven shape as a diffusion film of the present invention.

FIG. 13 represents a polymer or a resist pattern manufactured on a positive photosensitive photoresist using a diffuser of a surface having an uneven shape as a light diffusion film. As illustrated in FIG. 13, a circular shape of asymmetric structure with inclined shape of constant angle is formed. It is a result in case that a prism which a left figure has an inclination angle of 23°, and a right figure has an inclination angle of 39° is used as the light refraction film. Consequently, a different shape of the polymer or resist pattern each other according to the inclination angle can be formed.

Figure 14:
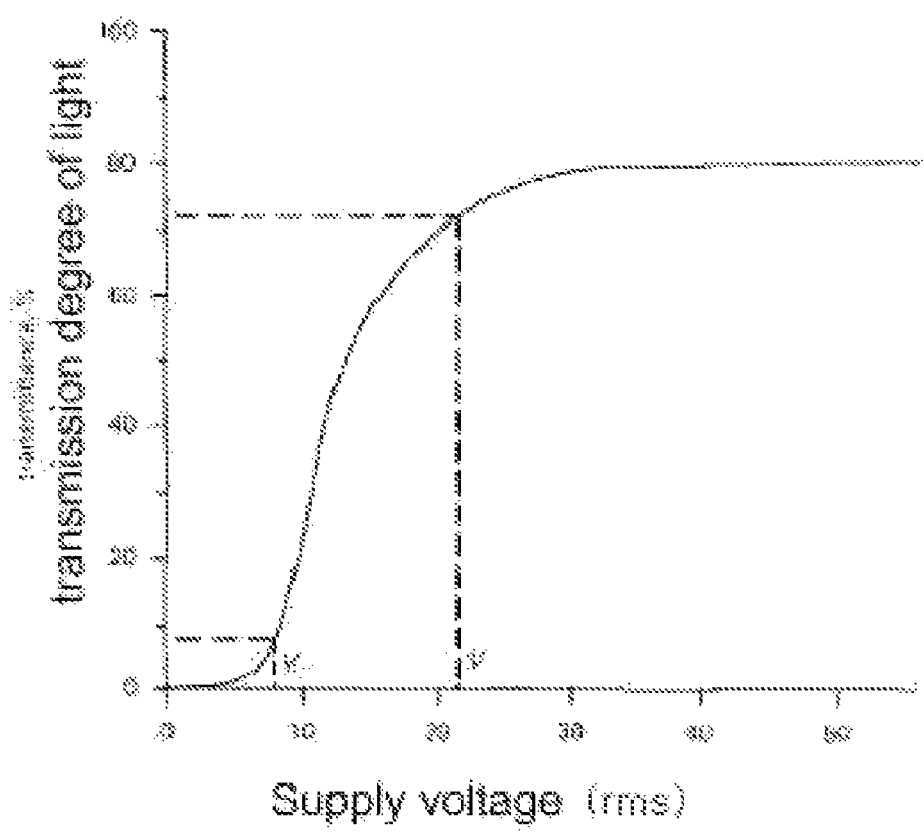
FIG. 14 represents a polymer dispersed liquid crystal film of the present invention.

FIG. 14 represents a polymer dispersed liquid crystal film as another embodiment of the light diffusion film 430 described in FIG. 6.

FIG. 14(a) represents a polymer dispersed liquid crystal film as the light diffusion film. As illustrated in FIG. 14(a), the polymer dispersed liquid crystal film 503 is putted between two glass substrates 501 which a transparent electro-conductive film is evaporated in both planes. In this case, the polymer dispersed liquid crystal film 503 decides a transmission degree of light according to a dispersed strength of light incident on the internal polymer dispersed liquid crystal and is not in want of a polarizer differently with a nematic liquid crystal. In this case, polymers have some structures which the liquid crystal molecularity is dispersed by a majority, or the liquid crystal is included in a net shape of polymer, etc. If a voltage is not supplied to the transparent electro-conductive film being formed on both planes, then the polymer dispersed liquid crystal film 503 arranges the polymer dispersed liquid crystal 505 in an irregular direction and occurs to disperse in the interface having a different refraction rate with an object. However, if a voltage is supplied to the transparent electro-conductive film, the direction of the polymer dispersed liquid crystal 505 is arranged in the direction of electric field, and the light can be transmitted completely. (G. Spruce and R. D. Pringle, Electronics & Communication Engineering Journal, pp. 91-100, 1992)

FIG. 14(b) represents a transmission ratio (%) of light according to a root mean square (rms) value of supply voltage being supplied to the transparent electro-conductive film. As illustrated in FIG. 14(b), the larger the rms value of supply voltage in the polymer dispersed liquid crystal film is, the larger the transmission rate of light is. (G. Spruce and R. D. Pringle, Electronics & Communication Engineering Journal, pp. 91-100, 1992)

Herein, if it controls the rms value of voltage supplied to the transparent electro-conductive film being formed on both planes of the polymer dispersed liquid crystal film and the supply time, then it can control sequentially the dispersed strength of light of the polymer dispersed liquid crystal film (i.e., the diffusion degree and transmission rate) and decide the progress direction of light by diffusing light according to the dispersed strength of light. Hereby, as an amount of light projected on the photo-sensitive polymer or resist film and a shape of reactive section are changed according to the rms value of voltage supplied to the transparent electro-conductive film and the supply time, it can form the polymer or resist pattern of three-dimensional asymmetric structure having various inclinations and shapes.

In this case, the voltage supplied to the polymer dispersed liquid crystal film is either of DC voltage or AC voltage. In case of supplying the DC voltage, the diffusion strength and the amount of light transmitted are controlled according to the rms value of DC voltage. In other words, in case of supplying the AC voltage, it controls the rms value, rate and period of a constant voltage and an inverse voltage each, according to the rms value of AC voltage, and the diffusion strength and the amount of light transmitted is controlled. Also, the common electrode which is not patterned may be used for the transparent electro-conductive film, and it may use either of passive matrix or active matrix method. The polymer dispersed liquid crystal film can be composed variously of not only a glass substrate or transparent electro-conductive film but also a flexible polymer substrate or electro-conductive polymer, etc. Also, it can be manufactured with a shape sticked to the photomask.

Figure 15:
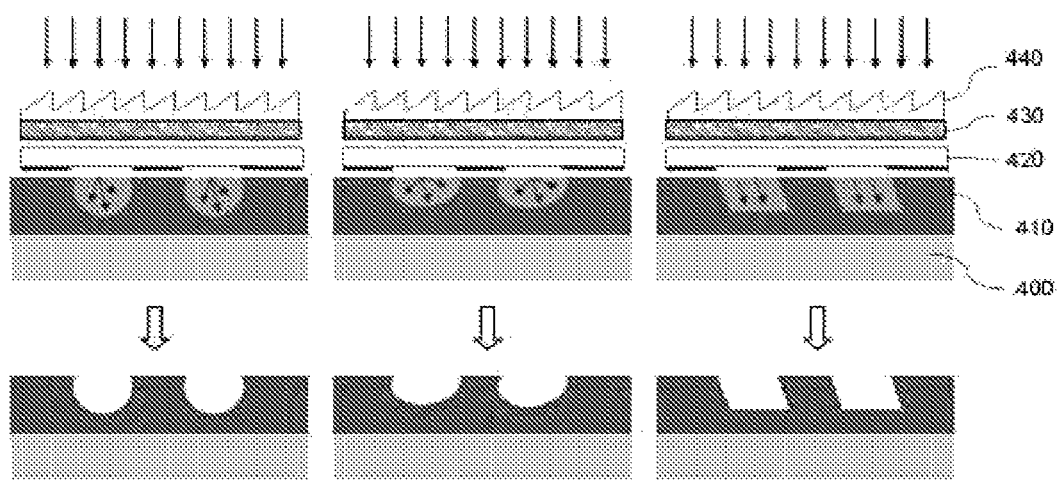
FIG. 15 represents an embodiment using a prism or prism sheet as a light refraction film and a polymer dispersed liquid crystal film as a light diffusion film of the present invention.

FIG. 15 represents a method of forming a polymer or a resist pattern in three-dimensional asymmetric structure. It is the embodiment using the prism or prism sheet as the light refraction film 440, and the polymer dispersed liquid crystal film as the light diffusion film 430. At first, the polymer dispersed liquid crystal film 430 is situated at the route of light in case of exposing, and then the prism sheet 440 as for the light refraction film is situated on it. In this case, it is simple and desired to use a general lithography device that the polymer dispersed liquid crystal film 430 and prism sheet 440 is putted on the photomask 420. However, it can expect the same effect wherever it is putted at the route of light. The refracted light through the prism sheet 440 is collimated on the polymer dispersed liquid crystal film 430, and the incident light is projected by being controlled a strength of dispersing (i.e., the diffusion degree) according to the strength of supply voltage on the polymer dispersed liquid crystal film 430. If this light is projected through the photomask 420 and is exposed on the polymer or resist film 410, then it can form the polymer or resist pattern having various shapes of three-dimensional asymmetric structure from a circular shape to a rectangular shape.

Figure 16:
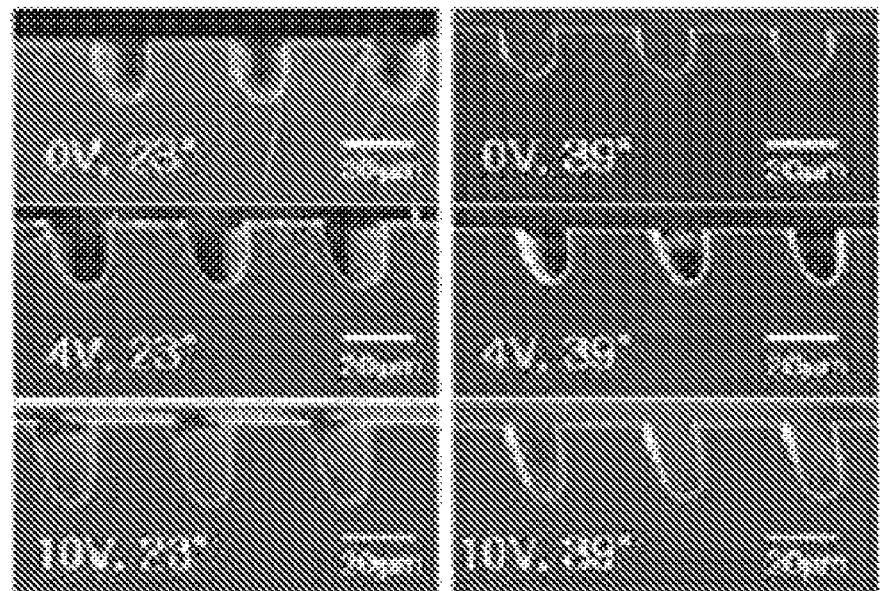
FIG. 16 represents an electron microscope photo of a polymer or a resist pattern in three-dimensional asymmetric structure manufactured variously according to a supply voltage and a supply time (i.e., exposure quantity) using a polymer dispersed liquid crystal film as a light diffusion film of the present invention.
Figure 16:
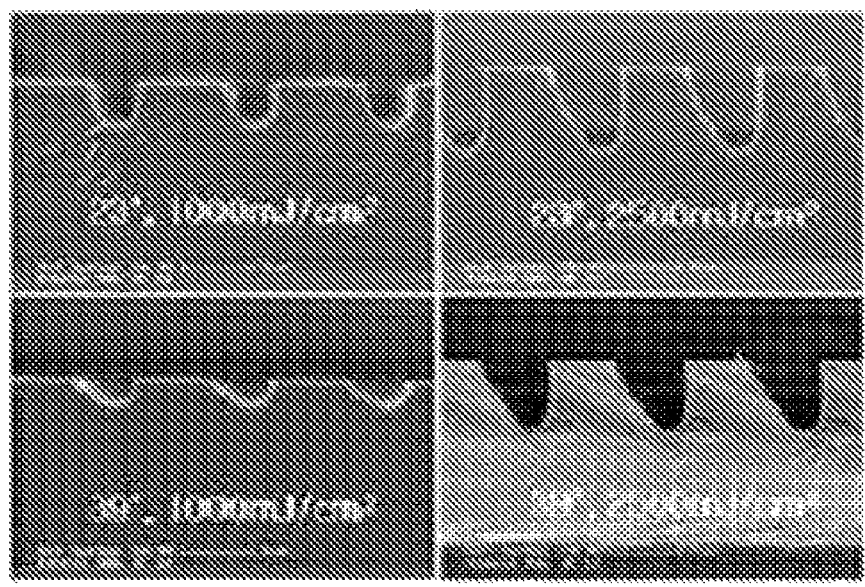

FIG. 16 represents a pattern change according to a supply voltage and supply time (i.e., exposure quantity) supplied to a polymer dispersed liquid crystal film as a light diffusion film.

At first, FIG. 16 (a) represents a change of three-dimensional asymmetric polymer or resist pattern being formed according to a change of exposure quantity (i.e., the strength of voltage supplied to the polymer dispersed liquid crystal film as for the light diffusion film with constant duration for exposing). As illustrated in FIG. 16(a), a diffusion degree and projection degree is controlled according to a change of the supply voltage when the strength of supply voltage is changed into 0V, 4V, 10V with constant supply time of 20 μm. Thus, it can obtain the polymer or resist pattern having a shape of three-dimensional asymmetry inclined variously from circular shape having a lower perpendicular height to circular shape having gradually a higher perpendicular height, and rectangular shape obtained from a general lithography process. Also, it is comprehensible that the shape is changed by a change of refraction angle with an inclination angle. Pictures of a left electron microscope are in case of using an inclination angle of 23°, and pictures of a right electron microscope is in case of using a inclination angle of 39°.

FIG. 16(b) represents a change of a polymer or a resist pattern having three-dimensional asymmetry being formed according to a change of supply time of light (i.e., an exposure quantity), with constant voltage supplied to the polymer dispersed liquid crystal film as for the light diffusion film. A pattern of right pictures (exposure quantity is 2500 mJ/cm2) in comparison with left pictures (exposure quantity is 1000 mJ/cm2) has an increased supply time. Accordingly, it is comprehensible that the inclination is deepened in the perpendicular direction and increased. Also, the upper pictures is resist patterns manufactured by using the prism of inclination angle of 23°, and the lower pictures is resist patterns manufactured by using the prism of inclination angle of 39°. According as the inclination angle used by the light refraction film being increased, patterns is inclined more and manufactured with an asymmetric shape. Hereby, it can obtain various polymer or resist patterns having three-dimensional asymmetric structure through the change of voltage supplied to the polymer dispersed liquid crystal film and the control for the supply time.

The above embodiment of FIG. 16 is an explanation for the positive photo-sensitive resist pattern. However, it is axiomatic that a negative photo-sensitive polymer or resist pattern can form various polymer or resist patterns having three-dimensional asymmetric structure that the opened part and left part are formed by contrast.

Figure 17:
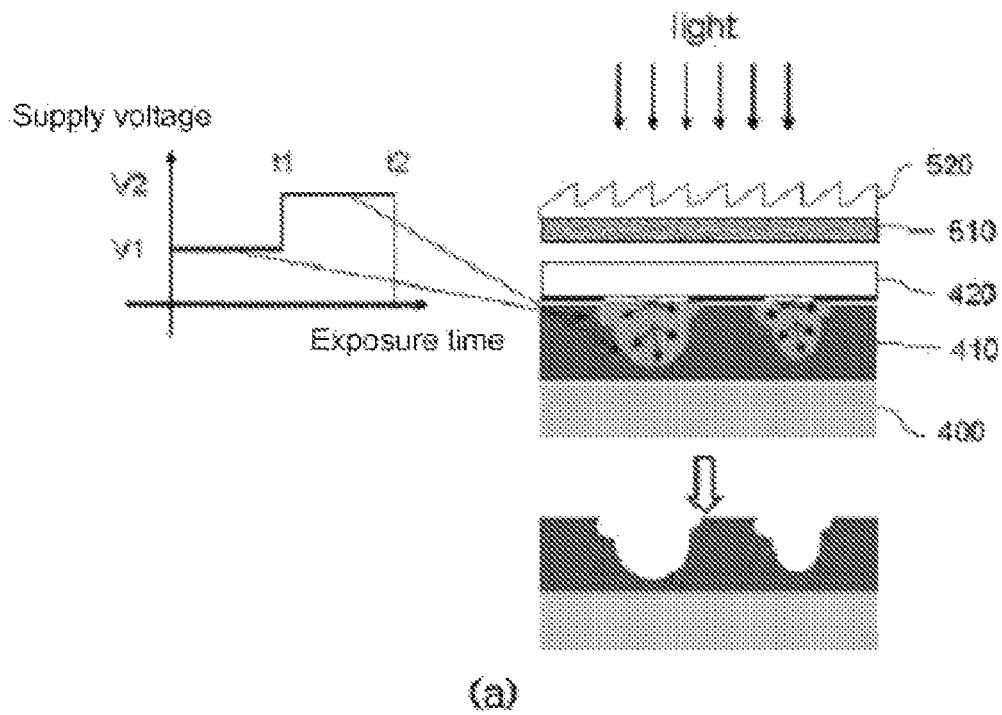
FIG. 17 represents a pattern change in case of changing spontaneously a strength of supply voltage and supply time (i.e., exposure quantity) supplied to a polymer dispersed liquid crystal film in process of the present invention.
Figure 17:
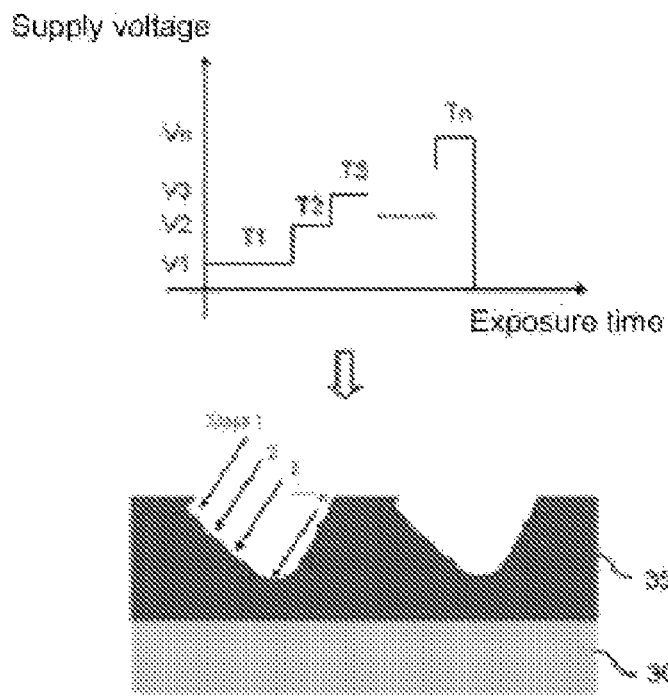

FIG. 17 represents a pattern change in case of changing spontaneously the strength of supply voltage and supply time supplied to a polymer dispersed liquid crystal film.

Firstly, FIG. 17 (a) is for a case that varies the strength of voltage supplied to polymer dispersed liquid crystal from V1 to V2 and varies the supply time of supply voltage from t1 to t2 at the same time. As illustrated in the drawing, while controlling simultaneously the strength and time of supply voltage supplied to the polymer dispersed liquid crystal, the polymer and resist pattern in a different shape or curvature according to a pattern depth can be obtained, and three-dimensional asymmetric polymer or resist pattern having more various and complex structures can be formed.

FIG. 17 (b) is for a case that varies the strength of voltage supplied to the polymer dispersed liquid crystal from V1 to V2, V3 ... Vn and varies the time of supply voltage from T1 to T2, T3 ... Tn at the same time. As illustrated in the drawing, when varying the strength (V1~Vn) and time (T1~Tn) of voltage supplied to the polymer dispersed liquid crystal, three-dimensional asymmetric polymer or resist pattern that has various angles of slopes (slope 1~slope n) according to a pattern depth can be formed.

For a DC voltage, various shapes of pattern can be formed by controlling the strength and time of DV voltage. For an AV voltage, various shapes of pattern can be formed as a combination of the strength, ratio and frequency of both the internal voltage and the reverse voltage.

Figure 18:
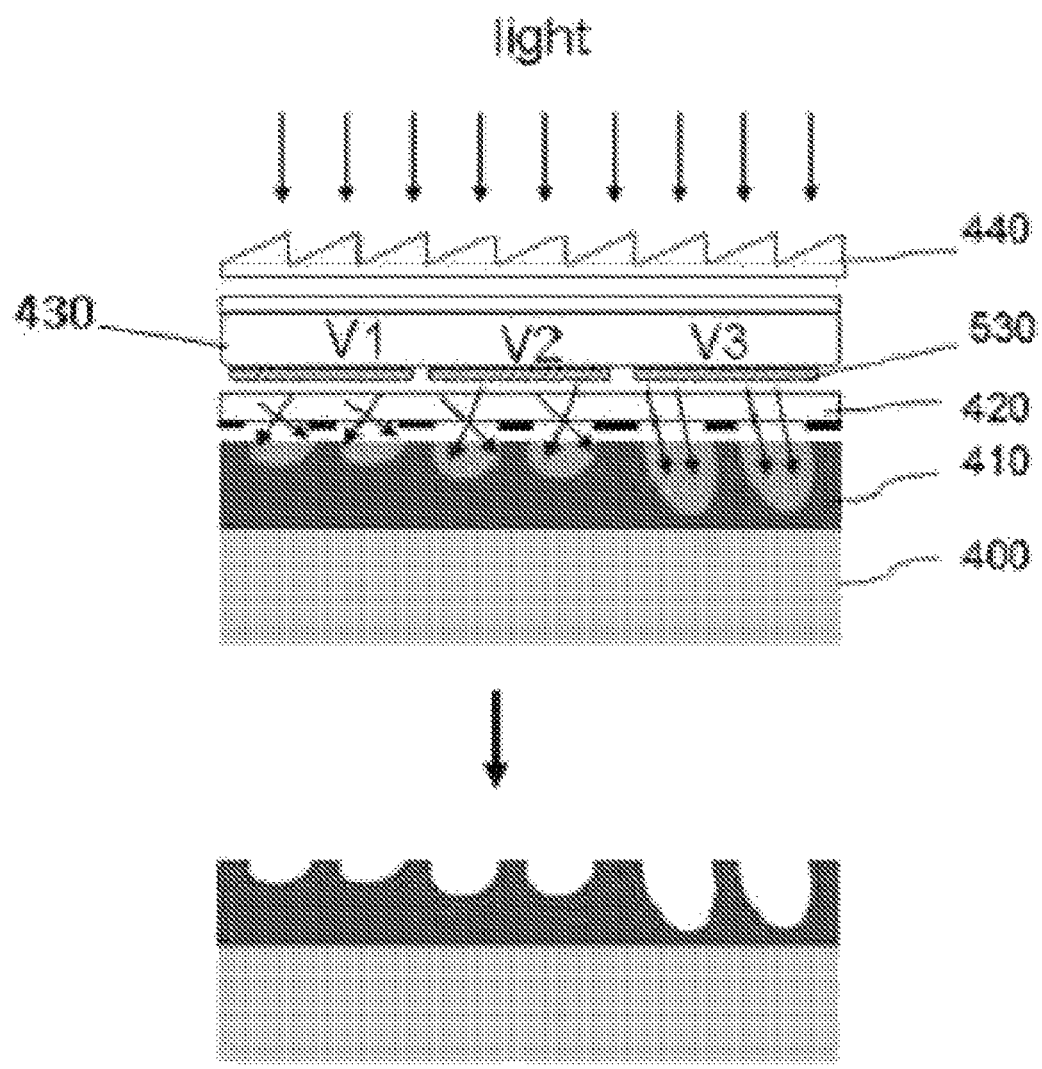
FIG. 18 represents a method of forming various shapes of pattern with one exposure process in case of controlling separately a partial diffusion strength and a transmission degree of polymer dispersed liquid crystal film according to the present invention.

FIG. 18 is describing a polymer and resist pattern using a transparent electro-conductive film patterned according to another embodiment of the present invention.

As illustrated in FIG. 18, a different shape of three-dimensional asymmetric polymer or resist pattern can be formed in an exposure process by forming a plurality of transparent electro-conductive films 525 patterned on the surface of light diffusion film 430 and by controlling the strength and time of supply voltage V1, V2, V3 on each of transparent electro-conductive film 525. If the polymer or resist pattern having different shape of three-dimensional asymmetric structure controls partially the strength of supply voltage and supply time supplied to the transparent electro-conductive film 525 through a method of addressing, then a transmission degree or progress direction of light is controlled in part of a transparent electro-conductive film 525 formed on the surface of the light diffusion film 430. Accordingly, all parts are not formed by a pattern of same shape, and it can form the polymer or resist pattern having partially different shape of three-dimensional asymmetric structure through a method of addressing. In this case, in order to supply selectively a voltage for each of transparent electro-conductive film 525, a method of addressing can use either passive addressing or active addressing known as a method of addressing a general liquid crystal. Also, it can use simply an electrode of one side as common electrode and control by patterning an electrode of the other side by the line and use a method of active addressing as a switching element.

Figure 19:
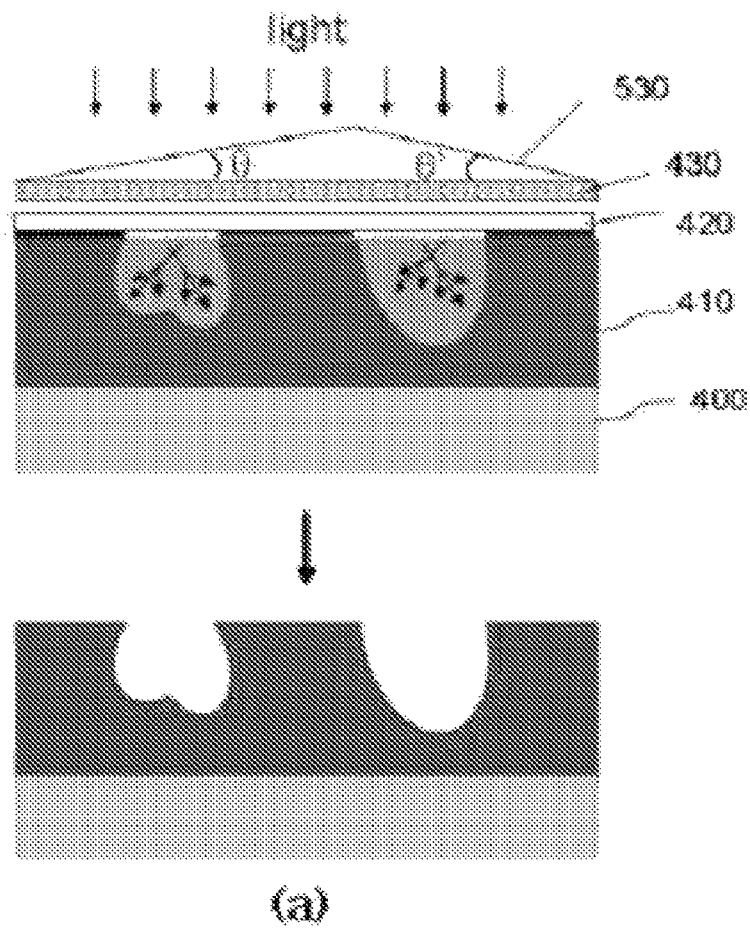
FIG. 19 represents a method of forming a polymer or a resist pattern using prism or prism sheet having two inclined planes with a shape of general triangle as a light refraction film according to the present invention.
Figure 19:
Figure 22:
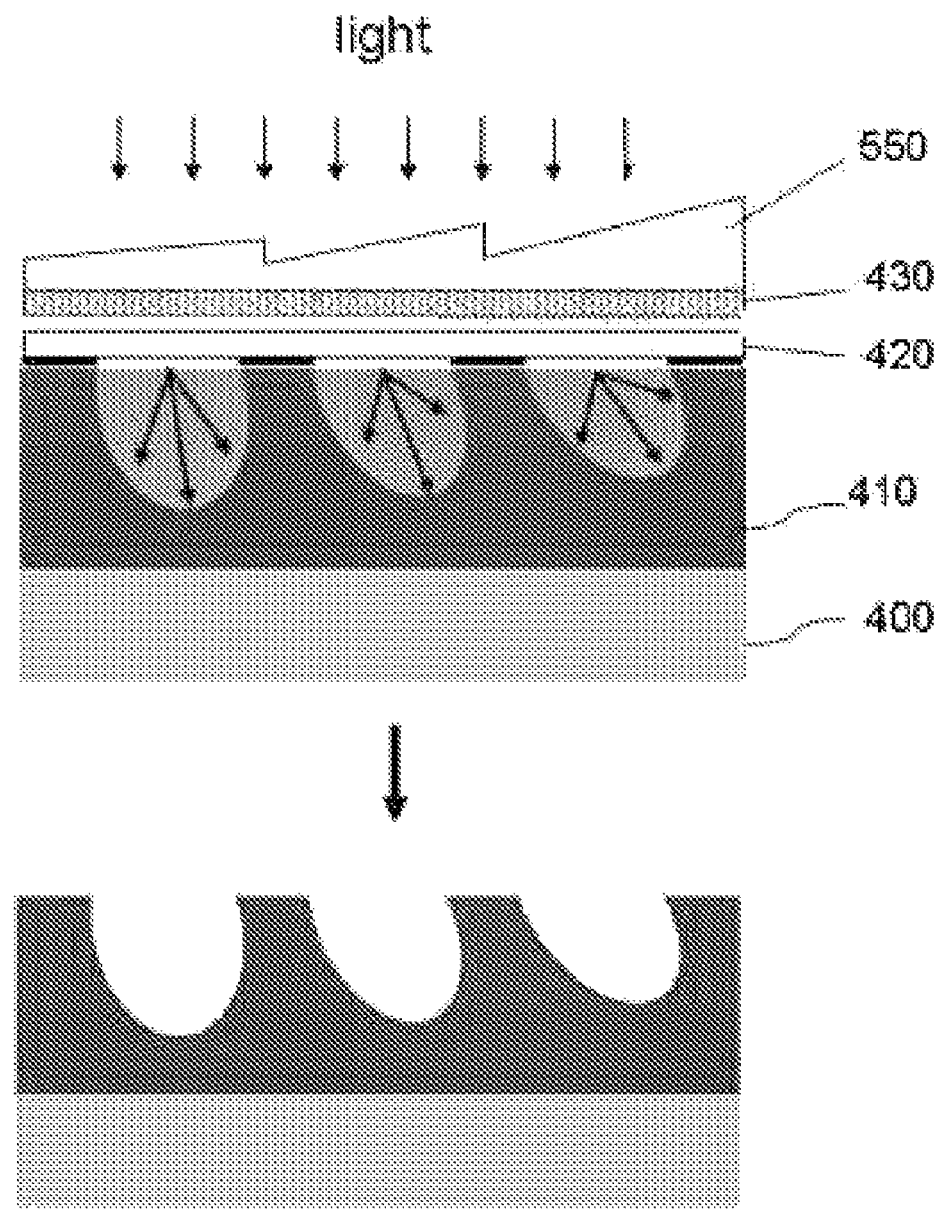
FIG. 22 represents a method of forming a polymer or a resist pattern using a prism sheet which an inclination angle is formed differentially according to a situation as a light refraction film according to the present invention.

FIGS. 19 and 22 represent a method of forming a polymer or a resist pattern having various three-dimensional asymmetric structure according to a shape of a light refraction film.

At first, FIG. 19(a) represents a case of using both sides of prism or prism sheet 530 having two inclined planes with a shape of general triangle as a light refraction film. As illustrated in FIG. 19(a), if light transmits both sides θ, θ' of prism or prism sheet 530 having two inclined planes, then it is refracted with two angles, and two lights refracted is diffused by transmitting the light diffusion film 430. The refracted light is added at a distance and is progressed, and then it can form the polymer or the resist pattern having various three-dimensional asymmetric structures. FIG. 19(b) represents a positive photo-sensitive photoresist pattern having three-dimensional asymmetric structure manufactured by FIG. 19(a).

Figure 20:
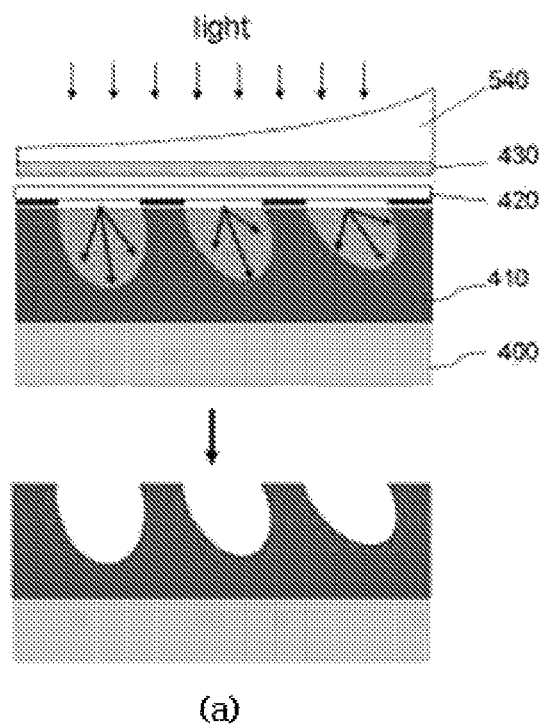
FIG. 20 represents a method of forming a polymer or a resist pattern using a curved prism or prism sheet having a serial inclined plane as a light refraction film according to another embodiment of the present invention.
Figure 20:
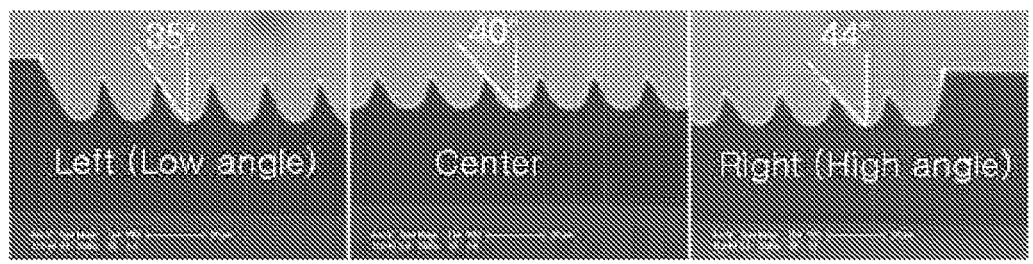

Subsequently, FIG. 20(a) represents a case of using a curved prism or prism sheet 540 having a serial inclined plane as a light refraction film. As illustrated in FIG. 20(a), as an angle refracted serially in a curved plane of the light refraction film 540 is changed, it can form a polymer or a resist pattern having three-dimensional asymmetric structure inclined differently according to the situation, respectively. The pattern is inclined lowly in case of having a small inclination angle. The larger the inclination angle is, the more inclined the pattern is. FIG. 20(b) represents a positive photo-sensitive photoresist pattern having three-dimensional asymmetric structure manufactured by FIG. 20(a). It represents the inclination angle 35°, 40°, 45° being changed according to the situation.

Figure 21:
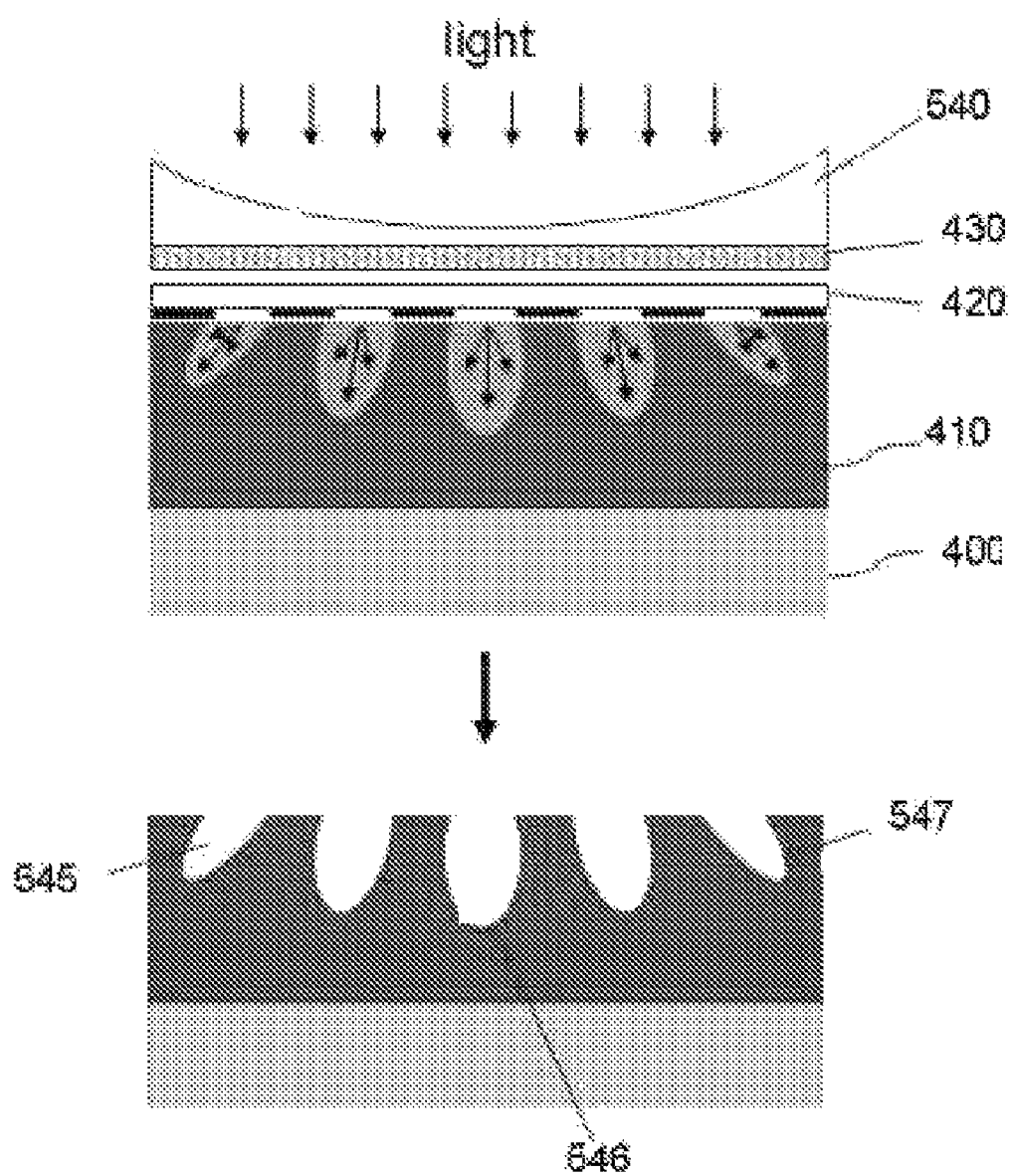
FIG. 21 represents a method of forming a polymer or a resist pattern using a curved prism or prism sheet having a serial inclined plane as a light refraction film according to another embodiment of the present invention.

Subsequently, FIG. 21 represents a case of using a hemi-spherical curved shape of prism or prism sheet having a serial inclined plane as a light refraction film. As illustrated in FIG. 21, as the hemi-spherical curved shape of prism 540 is formed, the light is collimated with being inclined to the left side at the left part by the inclination of the left part, and three-dimensional shape 345 inclined to the left side is formed. In other words, un-inclined shape 546 on the center part is formed, and three-dimensional shape 547 inclined shape to the right side at the right part is formed.

Subsequently, FIG. 22 represents a case of using a prism or prism sheet 550 which an inclination angle is formed differentially according to a situation as a light refraction film. As illustrated in FIG. 22, as the light is refracted differently according to the inclination angle by the situation of prism, respectively, the polymer or resist pattern having three-dimensional asymmetric structure inclined differently according to a corresponding situation can be formed.

In combination with methods described in FIG. 19 and FIG. 22, If it refracts a light with a different angle according to a situation of the light refraction film and controls a different diffusion degree and strength according to a situation by using the light diffusion film at the same time, then it can form the polymer or resist pattern having the most complex and various structures of three-dimensional asymmetry.

Figure 23:
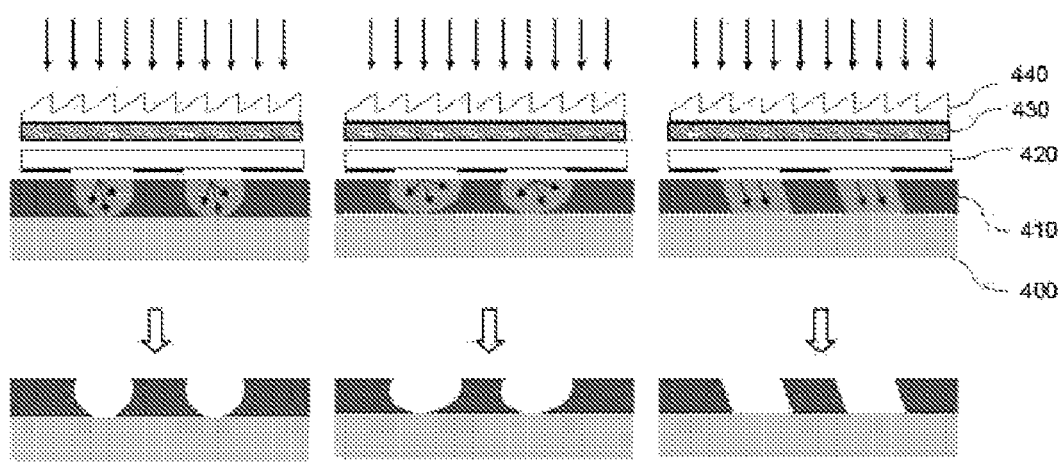
FIG. 23 represents a method of controlling an inclination of a polymer or a resist pattern by a method of forming a polymer or a resist pattern according to the present invention.

FIG. 23 represents a method of controlling an inclination of a polymer or a resist pattern by a method of forming the polymer or the resist pattern. The above drawings and particular explanations represent the embodiment that the polymer or resist pattern is exposed until the middle. However, as illustrated in FIG. 23, if it exposes to the bottom of a polymer or a resist film 410 by using the thin polymer or resist film 410, it can control variously the inclination of the polymer or resist pattern having three-dimensional asymmetric structure.

Figure 24:
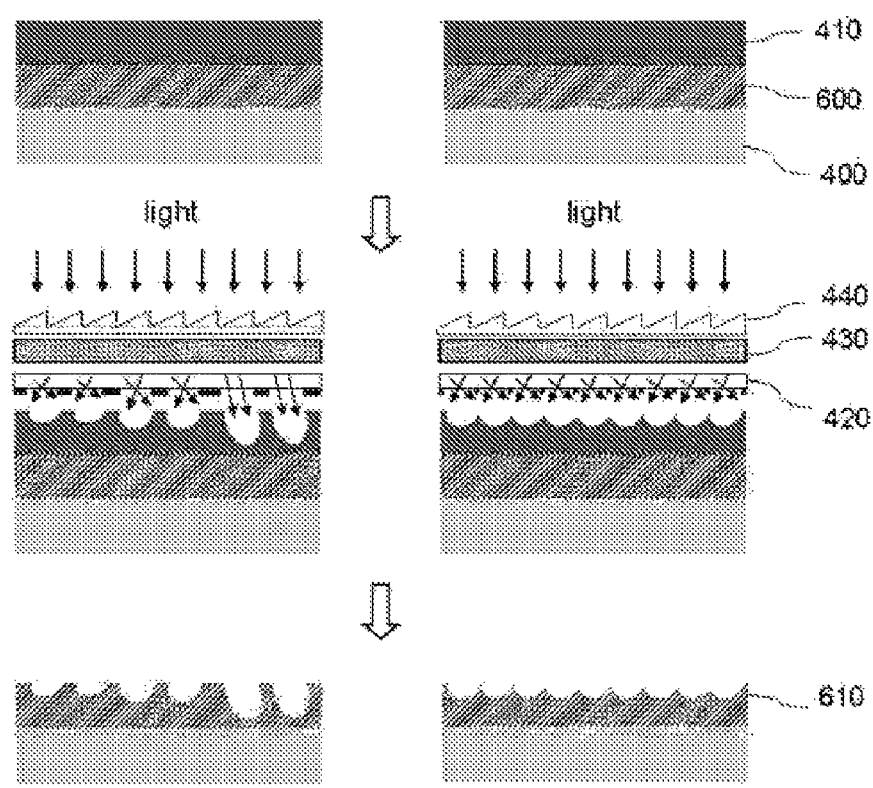
FIG. 24 represents a method of transferring a pattern using a method of forming a polymer or a resist pattern according to the present invention.

FIG. 24 represents a method of transferring a pattern using a method of forming a polymer or a resist pattern according to the present invention. As illustrated in FIG. 24, at first, it forms a transmission film 600 for transmitting on the substrate 400 and a polymer or a resist film 410 on the transmission film 600. By using a method of forming polymer or resist, it forms the polymer or resist pattern having a required shape on the polymer or resist pattern film 410. Subsequently, by using the formed the polymer or resist pattern, if it etches by a method of etching out of processes for manufacturing a semiconductor (for example, ion milling and plasma etching the front plane, etc), then the polymer or resist pattern formed on the polymer or resist film 410 is transmitted to the transmission film 600 with the same pattern. In this case, if it controls an etching ratio of the transmission film 600 and the polymer or resist film 410, then it can control in the way that a size difference of inclination or that of surface shape is increasing or decreasing.

Figure 25:
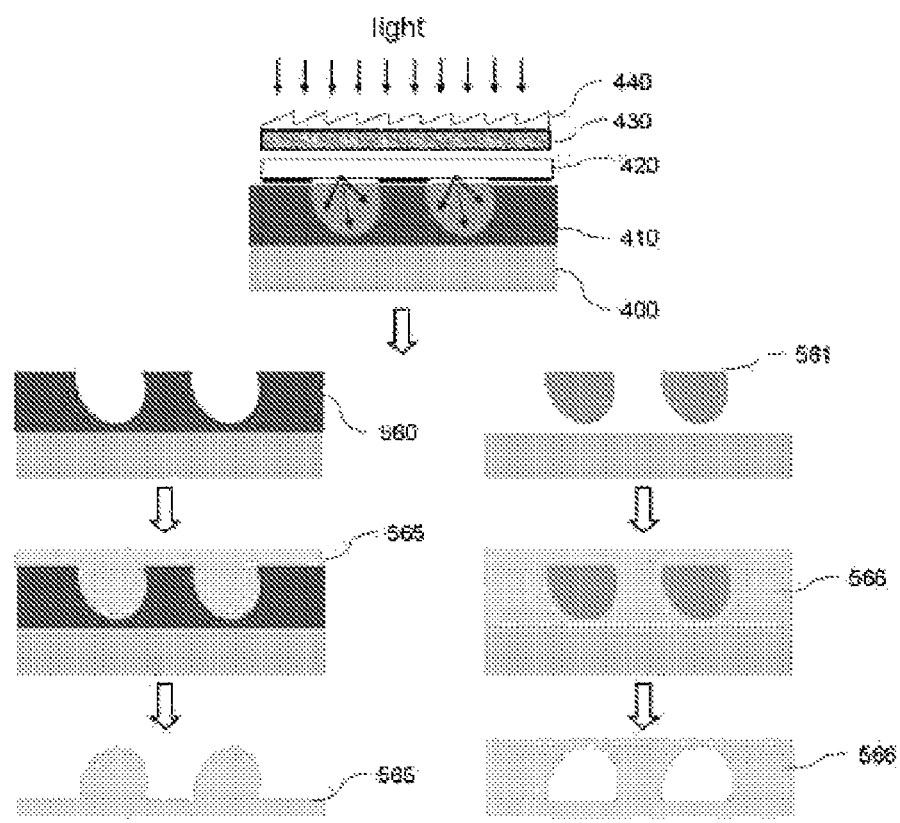
FIG. 25 represents a method of forming plastic or polymer mold using a method of forming a polymer or a resist pattern according to the present invention.
Figure 25:
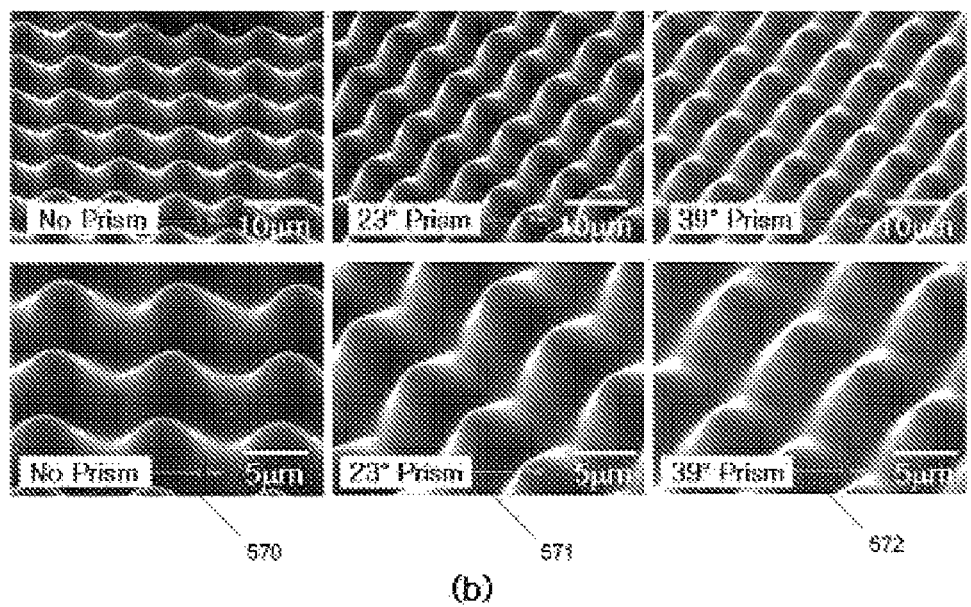

FIG. 25(a) represents a method of forming a mold using a method of forming a polymer or a resist pattern according to another embodiment of the present invention. As illustrated in FIG. 25(a), it pours and hardens a plastic or a polymer that is a material of forming mold over the polymer or resist pattern 560, 561 of three-dimensional asymmetric structure having various inclinations and shapes formed by a method of forming the polymer or resist pattern according to the present invention. Thereafter, by a method of removing or dismantling by putting the original polymer or resist pattern 560 and plastic or polymer mold 565, 566 in a etching solution, it makes new plastic or polymer mold 565, 566 transmitted from the original polymer or resist pattern 560. By the method of forming mold, it can form an original form of stamp for pulling pattern several times or micro-fluidic channel, etc.

FIG. 25(b) represents plastic or polymer mold of various three-dimensional structures being formed by a method of forming mold described in FIG. 25(a). The left picture 570 represents symmetric shape as a case which a light refraction film is not used. However, the center picture 571 which prism having an inclination angle of 23° is used and the right picture 572 which prism having an inclination angle of 39° can form a mold having asymmetric shape, respectively.

Figure 26:
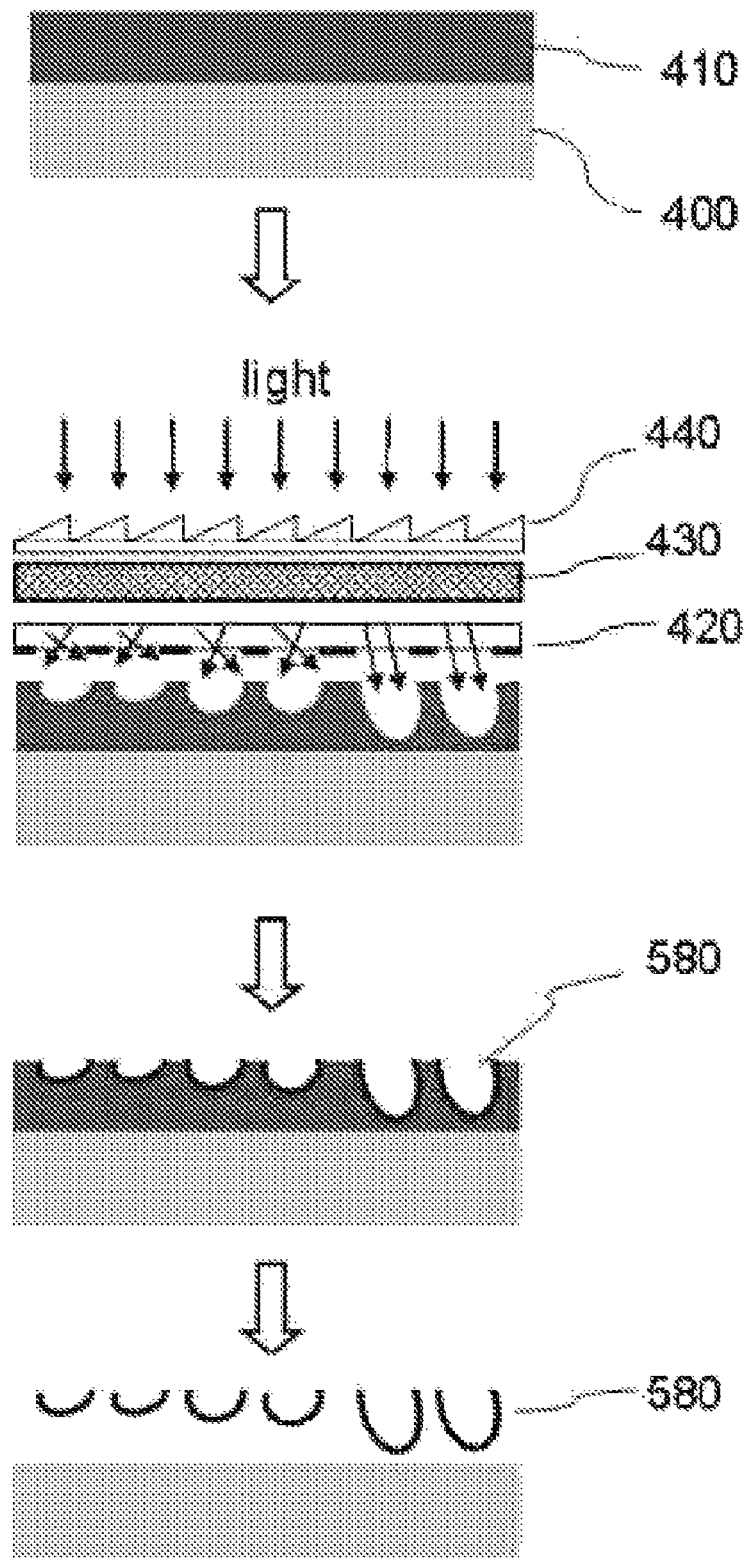
FIG. 26 represents a method of forming a metal thin-film pattern using a method of forming a polymer or a resist pattern according to the present invention.

FIG. 26 represents a method of forming a metal thin-film pattern using a method of forming a polymer or a resist pattern according to the present invention.

As illustrated in FIG. 26, the method of forming a metal thin-film pattern can form a metal thin-film of three-dimensional asymmetric structure having various curved planes by applying a polymer or a resist pattern or transmitted pattern of three-dimensional asymmetric structure having various inclinations and shapes described above. In other words, it can form the metal thin-film 580 over a pattern by using thick-film of plating method, etc. or various methods of evaporating or sputtering a thin film, etc. over the structure of the polymer or resist pattern or transmitted pattern of three-dimensional asymmetric structure having various inclinations and shapes formed by a method forming the polymer or resist pattern according to the present invention. Thereafter, if it removes the polymer or resist pattern by wet etching or dry etching, then it can form the metal thin film of three-dimensional asymmetric structure having various inclinations and shapes.

Figure 27:
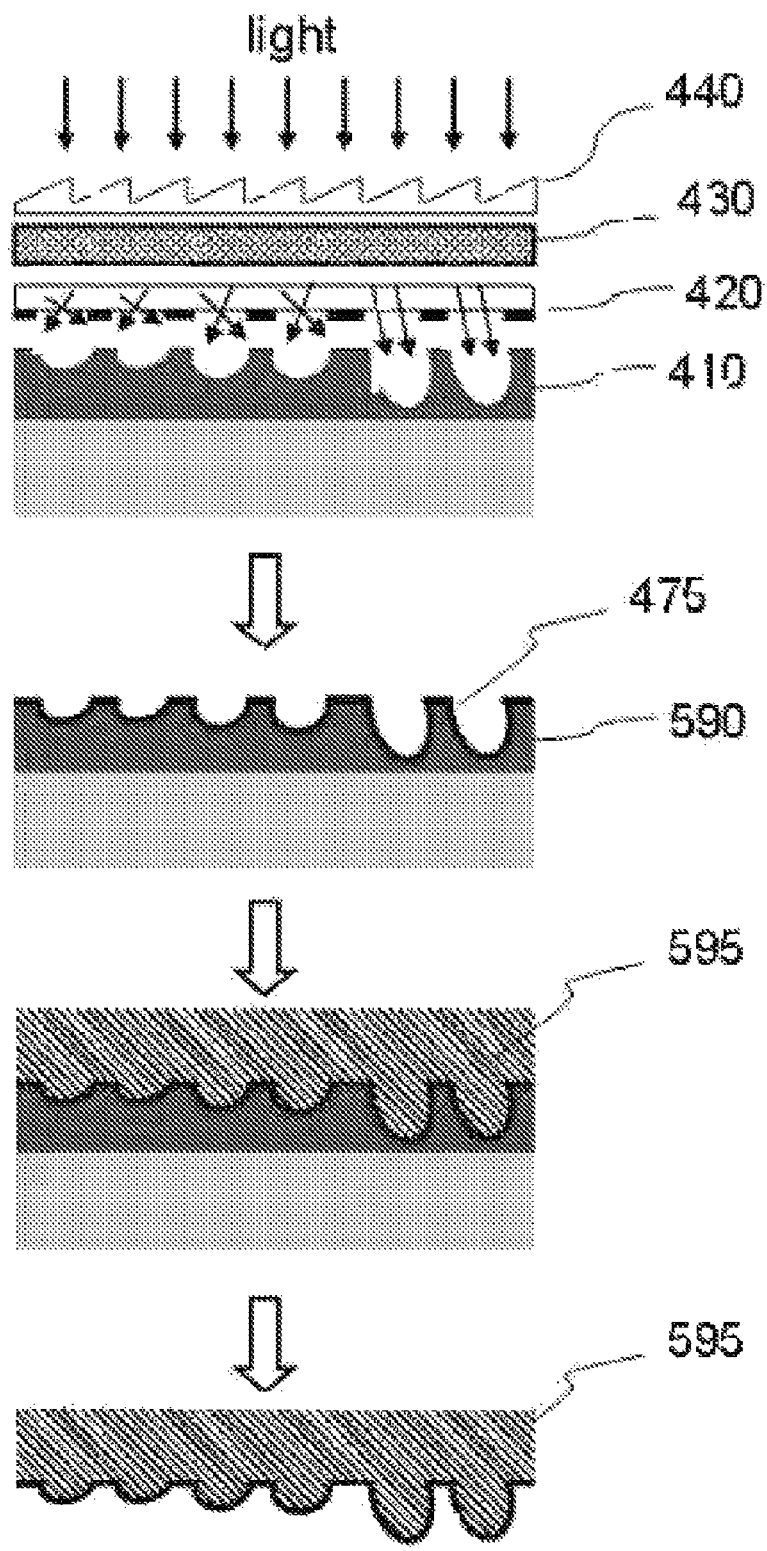
FIG. 27 represents a method of forming a metal pattern using a method of forming a polymer or a resist pattern according to the present invention.

FIG. 27 represents a method of forming a metal pattern using a method of forming a polymer or a resist pattern according to another embodiment of the present invention.

As illustrated in FIG. 27, the method of forming a metal pattern, after forming the metal thin film over the polymer or resist pattern or a transmitted pattern of three-dimensional asymmetric structure having various inclinations and shapes formed by a method forming the polymer or resist pattern according to the present invention, further forms the metal pattern 595 by plating. By a method of removing or dismantling by putting original polymer or resist pattern 560 in an etching solution, it makes new metal pattern transmitted from original pattern. By above method, it can form an original form of stamp having an inverse image for pulling pattern several times.

As illustrated above, unlike means and method used in conventional lithography process, the present invention can form simply three-dimensional asymmetric structure having various inclinations and shapes.

Also, in case of manufacturing the polymer or resist pattern, by controlling a progress direction of light, a dispersed strength of light and a transmission degree of light for reacting with the polymer or resist film in a exposure process out of lithography processes, the present invention can form simply three-dimensional asymmetric structure having various inclinations and shapes from a circular shape to a rectangular shape.

Also, the present invention changes variously a progress direction, a diffusion degree and strength of light during a exposure time and can form three-dimensional asymmetric structure having a curvature or a shape of inclination predetermined on one polymer or resist film.

Also, the present invention controls differently and selectively a progress direction, diffusion degree and strength of light, respectively, and can form three-dimensional asymmetric structure having various inclinations and shapes more than one in a horizontal or perpendicular direction. The patterns can transfer simply on the other film by various methods of plastic molding or etching, etc. Also, by applying this, it can manufacture easily a spherical or aspheric micro-lens and can manufacture more various and complex structure.

Also, a plastic or polymer mold structure using the polymer or resist pattern according to the present invention can decrease the rest material cost and form with a large area by very simple process manufacturing more various and complex structure than the conventional technique. Accordingly, it is expected that a practical use is higher than a material course device and micro-lens, etc. having micro scale out of applied examples.

Also, the present invention evaporates a metal film using the polymer or resist pattern and can form a metal thin-film and metal pattern of three-dimensional asymmetric structure having various shapes which could be not manufactured by a technique of conventional semiconductor process.

Also, the present invention can manufacture easily the polymer or resist pattern of three-dimensional asymmetric structure having various shapes which could be not manufactured by a technique of conventional semiconductor process and lithography method. This technique can be used widely in manufacturing micro-lens, forming metal thin film, manufacturing a plastic mold, manufacturing prominence and depression structure of surface, etc. and can be applied to various technique fields.

The invention being thus described may be varied in many ways. Such variations are not to be regarded as a departure from the spirit and scope of the invention and all such modifications as would be obvious to one skilled in the art are intended to be included within the scope of the following claims.

What is claimed is:

1. A method of forming a pattern comprising the steps of:
   (a) forming a photo-sensitive material film by coating a photo-sensitive material on a substrate;
   (b) deciding an exposure section on the photo-sensitive material film;
   (c) disposing a light refraction film and a light diffusion film at a route of light exposed on the photo-sensitive material film; and
   (d) forming a pattern on the photo-sensitive material film, by projecting a light on the exposure section of the photo-sensitive material film, wherein the light transmits through the light refraction film and then through the light diffusion film, and wherein the pattern is asymmetric in the perpendicular or horizontal direction to the substrate.

2. The method of claim 1, wherein the step of (b) decides the exposure section, by forming one of a photomask, an embedded mask and a metal pattern on the photo-sensitive material film.

3. The method of claim 1, wherein the step of (b) decides the exposure section, by disposing a micro mirror array at the route of light exposed on the photo-sensitive material film.

4. The method of claim 1, wherein the substrate is a transparent substrate.

5. The method of claim 4, wherein the step of (b) decides the exposure section, by forming one of a photomask, an embedded mask and a metal pattern on the upper or lower part of the transparent substrate.

6. The method of claim 1, wherein the light refraction film is a prism or prism sheet where a single-inclined plane, a multi-inclined plane, a multi-curved surface, a cone and many-sided cone are formed repeatedly.

7. The method of claim 1, wherein the light diffusion film is a diffuser or a polymer dispersed liquid crystal film.

8. The method of claim 7, further comprising the step of sequentially changing a supply voltage supplied to the polymer dispersed liquid crystal film or a supply time of light incident in the polymer dispersed liquid crystal film to control.

9. The method of claim 7, further comprising the step of partially controlling a supply voltage supplied to the polymer dispersed liquid crystal film or a supply time of light incident in the polymer dispersed liquid crystal film.

10. The method of claim 7, further comprising the step of forming an electrode patterned on both of the cross-sections or one cross-section of the polymer dispersed liquid crystal film.

11. The method of claim 7, further comprising the step of driving a passive matrix, by patterning more than one of electrodes situated on both of the cross-sections of the polymer dispersed liquid crystal film.

12. The method of claim 7, further comprising the step of driving an active matrix through a switching element, by patterning more than one of electrodes situated on both of the cross-sections of the polymer dispersed liquid crystal film.

13. The method of claim 1 further comprising the step of sequentially changing a diffusion degree of the light diffusion film to control.

14. The method of claim 1, further comprising the step of partially controlling a diffusion degree of the light diffusion film.

15. The method of claim 1, further comprising the step of (e) forming a plurality of transparent electro-conductive films on the surface of the light diffusion film between the light diffusion film and the photo-sensitive material film.

16. The method of claim 15, further comprising the step of supplying different voltages to the plurality of transparent electro-conductive films.

17. The method of claim 1, wherein the step of (d) forms the material pattern, by exposing to the bottom of the photosensitive material film.

18. The method of claim 1, wherein the step (a) comprises the step of forming a transfer film on the substrate; and the step of forming the photo-sensitive material film on the transfer film.

19. The method of claim 18, further comprising the steps of etching the material pattern and transferring the material pattern to the transfer film.

20. The method of claim 1, wherein the photo-sensitive material is a polymer or a resist.

21. The method of claim 1, wherein forming the pattern on the photo-sensitive material film is controlled using a micro mirror array.

22. A method of forming a mold comprising the steps of:
  (a) forming a photo-sensitive material film by coating a photo-sensitive material on a substrate;
  (b) deciding an exposure section on the photo-sensitive material film;
  (c) disposing a light refraction film and a light diffusion film at a route of light exposed on the photo-sensitive material film; and
  (d) forming a pattern on the photo-sensitive material film, by projecting a light on the exposure section of the photo-sensitive material film, wherein the light transmits through the light refraction film and then through the light diffusion film, and wherein the pattern is asymmetric in the perpendicular or horizontal direction to the substrate;
  (e) coating and solidifying a material forming a mold on the material pattern; and
  (f) separating the solidified material forming the mold from the material pattern.

23. The method of claim 22, wherein the material forming the mold is a plastic or a polymer.

24. The method of claim 22, wherein the step of (b) decides the exposure section by forming one of a photo mask, an embedded mask and a metal pattern on the photo-sensitive material film.

25. The method of claim 22, wherein the step of (b) decides the exposure section by depositing micro mirror array at the route of light exposed to the photo-sensitive material film.

26. The method of claim 22, wherein the light refraction film is a prism or prism sheet where a single-inclined plane, a multi-inclined plane, a multi-curved surface, a cone and many-sided cone are formed repeatedly.

27. The method of claim 22, wherein the light diffusion film is a diffuser or a polymer dispersed liquid crystal film.

28. The method of claim 22, wherein the photo-sensitive material is a polymer or a resist.

29. A method of forming a metal thin-film comprising the steps of:
  (a) forming a photo-sensitive material film by coating a photo-sensitive material on a substrate;
  (b) deciding an exposure section on the photo-sensitive material film;
  (c) disposing a light refraction film and a light diffusion film on a route of light exposed on the photo-sensitive material film; and
  (d) forming a pattern on the photo-sensitive material film, by projecting a light on the exposure section of the photo-sensitive material film, wherein the light transmits through the light refraction film and then through the light diffusion film, and wherein the pattern is asymmetric in the perpendicular or horizontal direction to the substrate;
  (e) forming a metal thin-film on the material pattern; and
  (f) removing the material pattern.

30. The method of claim 29, wherein the step of (b) decides the exposure section by forming one of a photo mask, an embedded mask and a metal pattern on the photo-sensitive material film.

31. The method of claim 29, wherein the step of (b) decides the exposure section by depositing micro mirror array at the route of a light exposed on the photo-sensitive material film.

32. The method of claim 29, wherein the step (e) forms the metal thin-film by a method of evaporating or sputtering a thin-film, or a method of forming a rear film including a method of plating.

33. The method of claim 29, wherein the refraction film is a prism or prism sheet where a single-inclined plane, a multi-inclined plane, a multi-curved surface, a cone and many-sided cone are formed repeatedly.

34. The method of claim 29, wherein the light diffusion film is a diffuser or a polymer dispersed liquid crystal film.

35. The method of claim 29, wherein the photo-sensitive material is a polymer or a resist.

36. A method of forming a metal pattern comprising the steps of:
 (a) forming a photo-sensitive material film by coating a photo-sensitive material on a substrate;
 (b) deciding an exposure section on the photo-sensitive material film;
 (c) disposing a light refraction film and a light diffusion film at a route of light exposed on the photo-sensitive material film; and
 (d) forming a pattern on the photo-sensitive material film, by projecting a light on the exposure section of the photo-sensitive material film, wherein the light transmits through the light refraction film and then through the light diffusion film, and wherein the pattern is asymmetric in the perpendicular or horizontal direction to the substrate;
 (e) forming a metal thin-film on the pattern;
 (f) forming a metal pattern on the metal thin-film by plating method; and
 (g) separating the metal pattern from the material pattern.

37. The method of claim 36, wherein the step of (b) decides the exposure section by forming one of a photo mask, an embedded mask or a metal pattern on the polymer or resist film.

38. The method of claim 36, wherein the step of (b) decides the exposure section by depositing micro mirror array at the route of a light exposed on the photo-sensitive material film.

39. The method of claim 36, wherein the refraction film is a prism or prism sheet where a single-inclined plane, a multi-inclined planer a multi-curved surface, a cone and many-sided cone are formed repeatedly.

40. The method of claim 36, wherein the light diffusion film is a diffuser or a polymer dispersed liquid crystal film.

41. The method of claim 36, wherein the material is a polymer or a resist.

* * * * *